United States Patent
Yanagi et al.

(10) Patent No.: US 10,336,061 B2
(45) Date of Patent: Jul. 2, 2019

(54) PRINTING APPARATUS, LIQUID ABSORBING APPARATUS, AND PRINTING METHOD

(71) Applicant: CANON KABUSHIKI KAISHA, Tokyo (JP)

(72) Inventors: Yuichiro Yanagi, Funabashi (JP); Masahiro Sugimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/920,838

(22) Filed: Mar. 14, 2018

(65) Prior Publication Data

US 2018/0272690 A1 Sep. 27, 2018

(30) Foreign Application Priority Data

Mar. 27, 2017 (JP) ................................. 2017-061880

(51) Int. Cl.

| B41J 2/005 | (2006.01) |
|---|---|
| B41M 5/025 | (2006.01) |
| B05C 1/08 | (2006.01) |
| B01J 20/34 | (2006.01) |
| B41J 2/175 | (2006.01) |

(Continued)

(52) U.S. Cl.
CPC ............ B41J 2/0057 (2013.01); B01J 20/34 (2013.01); B05C 1/0813 (2013.01); B05C 1/0886 (2013.01); B41J 2/17566 (2013.01); B41M 5/0256 (2013.01); B05C 1/083 (2013.01);

(Continued)

(58) Field of Classification Search
USPC .................. 347/100, 101, 102, 103; 101/470
See application file for complete search history.

(56) References Cited

U.S. PATENT DOCUMENTS 5,400,065 A * 3/1995 Tomono ................ B41C 1/1041
101/470
5,574,547 A * 11/1996 Denton ................ G03G 15/104
347/100

(Continued)

FOREIGN PATENT DOCUMENTS

| JP | 2003-182064 A | 7/2003 |
| JP | 2009-090274 A | 4/2009 |

OTHER PUBLICATIONS

U.S. Appl. No. 15/910,444, Masahiro Sugimoto Yuichiro Yanagi, filed Mar. 2, 2018.

(Continued)

*Primary Examiner* — Lam S Nguyen
(74) *Attorney, Agent, or Firm* — Venable LLP

(57) ABSTRACT

A printing apparatus includes a liquid absorption unit configured to absorb a liquid component from an ink image formed on a transfer member before transferring the ink image to a print medium. The liquid absorption unit includes a liquid absorbing member configured to absorb the liquid component, a support unit configured to support the liquid absorbing member to be movable cyclically, an applying unit arranged in a moving path of the liquid absorbing member and configured to apply a moisturizing liquid while contacting the liquid absorbing member, and a supply unit configured to supply the moisturizing liquid to the applying unit. The printing apparatus includes a control unit configured to control a supply amount of the moisturizing liquid to the applying unit supplied by the supply unit.

17 Claims, 14 Drawing Sheets

(51) Int. Cl.
*B41J 2/01* (2006.01)
*B05C 1/14* (2006.01)

(52) U.S. Cl.
CPC .............. *B05C 1/0834* (2013.01); *B05C 1/14* (2013.01); *B41J 2002/012* (2013.01)

(56) References Cited

U.S. PATENT DOCUMENTS

| | | | |
|---|---|---|---|
| 5,993,524 A * | 11/1999 | Nagai | B41M 5/52 106/31.27 |
| 6,682,189 B2 | 1/2004 | May et al. | |
| 6,767,092 B2 | 7/2004 | May et al. | |
| 8,038,285 B2 | 10/2011 | Uemura et al. | |
| 8,967,753 B2 * | 3/2015 | Suzuki | B41J 11/002 347/102 |

OTHER PUBLICATIONS

U.S. Appl. No. 15/920,479, Yuichiro Yanagi Masahiro Sugimoto, filed Mar. 14, 2018.

* cited by examiner

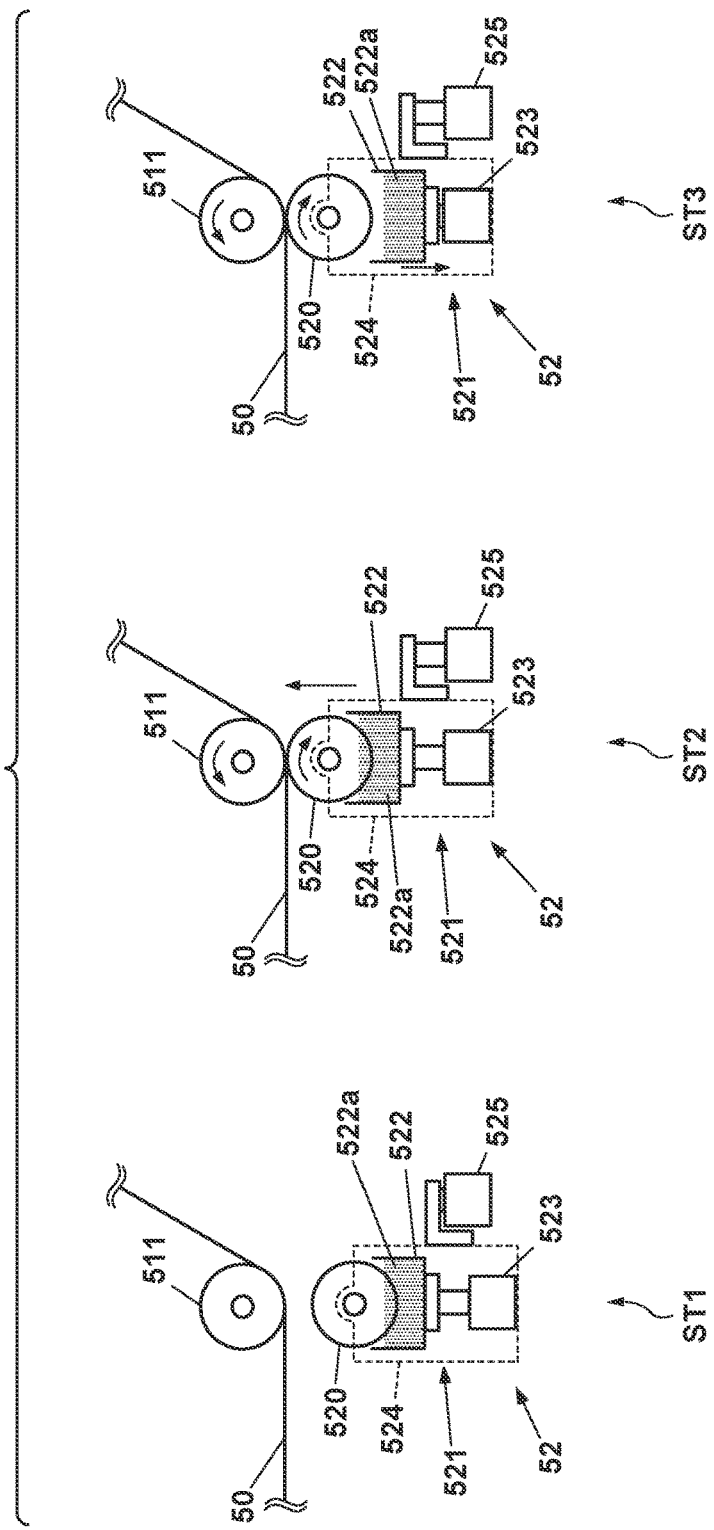

PRINTING APPARATUS, LIQUID ABSORBING APPARATUS, AND PRINTING METHOD

BACKGROUND OF THE INVENTION

Field of the Invention

The present invention relates to a transfer type printing technique.

Description of the Related Art

A technique of forming an ink image on a transfer member and transferring it to a print medium such as paper is proposed. For example, Japanese Patent Laid-Open No. 2003-182064 discloses an image forming apparatus configured to form an ink image on an intermediate member and transfer the ink image to a sheet. This apparatus includes an inkjet device that forms a primary image on the intermediate member. This apparatus also includes a zone where an aggregate is formed in the primary image, a zone where a liquid is partially removed from the aggregate, a zone where an image is transferred to a sheet, and a zone where the surface of the intermediate member is reproduced before a new primary image is formed. Japanese Patent Laid-Open No. 2009-90274 discloses a technique of intermittently applying a coating liquid to an intermediate transfer member by a roller.

It is possible to suppress a blur of an image printed on a print medium by absorbing and removing the liquid component of an ink image, like the zone where the liquid is partially removed from the aggregate, as described in Japanese Patent Laid-Open No. 2003-182064. If, however, a liquid absorbing member that absorbs the liquid component from the ink image is used and then dried, the surface is thickened, thereby degrading liquid absorption performance. In an arrangement of controlling an application amount by, for example, moving a roller for applying a moisturizing liquid to contact or separate from the liquid absorbing member in order to appropriately moisturize the liquid absorbing member, the liquid absorbing member may be damaged by repeating the moving operation.

SUMMARY OF THE INVENTION

The present invention provides a technique of reducing damage to a liquid absorbing member when moisturizing it.

According to an aspect of the present invention, there is provided a printing apparatus comprising a transfer member configured to cyclically pass through a formation area of an ink image and a transfer area of the ink image, a print unit configured to form the ink image on the transfer member by discharging ink to the transfer member in the formation area, a transfer unit configured to transfer the ink image from the transfer member to a print medium, a liquid absorption unit configured to absorb a liquid component from the ink image on the transfer member before the transfer by the transfer unit, and a control unit, wherein the liquid absorption unit includes a liquid absorbing member configured to absorb the liquid component, a support unit configured to support the liquid absorbing member to be movable cyclically, an applying unit arranged in a moving path of the liquid absorbing member and configured to apply a moisturizing liquid while contacting the liquid absorbing member, and a supply unit configured to supply the moisturizing liquid to the applying unit, and the control unit controls a supply amount of the moisturizing liquid to the applying unit supplied by the supply unit.

Further features of the present invention will become apparent from the following description of exemplary embodiments (with reference to the attached drawings).

BRIEF DESCRIPTION OF THE DRAWINGS

FIG. 10 is a view for explaining the operation of a recovery unit.

DESCRIPTION OF THE EMBODIMENTS

Embodiments of the present invention will be described with reference to the accompanying drawings. In each view, arrows X and Y indicate horizontal directions perpendicular to each other. An arrow Z indicates a vertical direction.

<Printing System>

Figure 1:
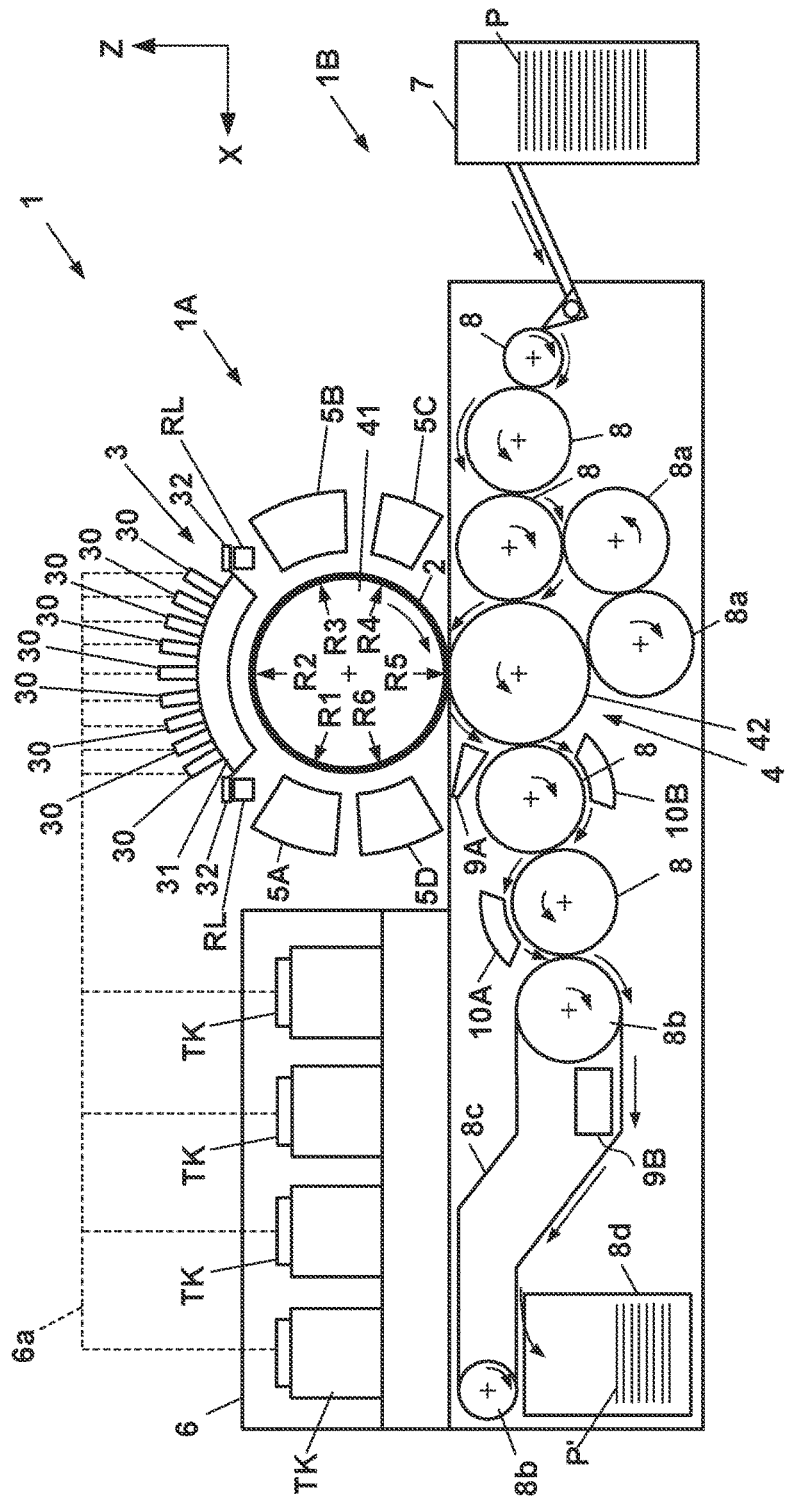
FIG. 1 is a schematic view showing a printing system.

FIG. 1 is a front view schematically showing a printing system (printing apparatus) 1 according to an embodiment of the present invention. The printing system 1 is a sheet inkjet printer that forms (manufactures) a printed product P' by transferring an ink image to a print medium P via a transfer member 2. The printing system 1 includes a printing apparatus 1A and a conveyance apparatus 1B. In this embodiment, an X direction, a Y direction, and a Z direction indicate the widthwise direction (total length direction), the depth direction, and the height direction of the printing system 1, respectively. The print medium P is conveyed in the X direction.

Note that "print" includes not only formation of significant information such as a character or graphic pattern but also formation of an image, design, or pattern on print media in a broader sense or processing of print media regardless of whether the information is significant or insignificant or has become obvious to allow human visual perception. In this embodiment, "print media" are assumed to be paper sheets but may be fabrics, plastic films, and the like.

An ink component is not particularly limited. In this embodiment, however, a case is assumed in which aqueous pigment ink that includes a pigment as a coloring material, water, and a resin is used.

<Printing Apparatus>

The printing apparatus 1A includes a print unit 3, a transfer unit 4, peripheral units 5A to 5D, and a supply unit 6.

<Print Unit>

Figure 2:
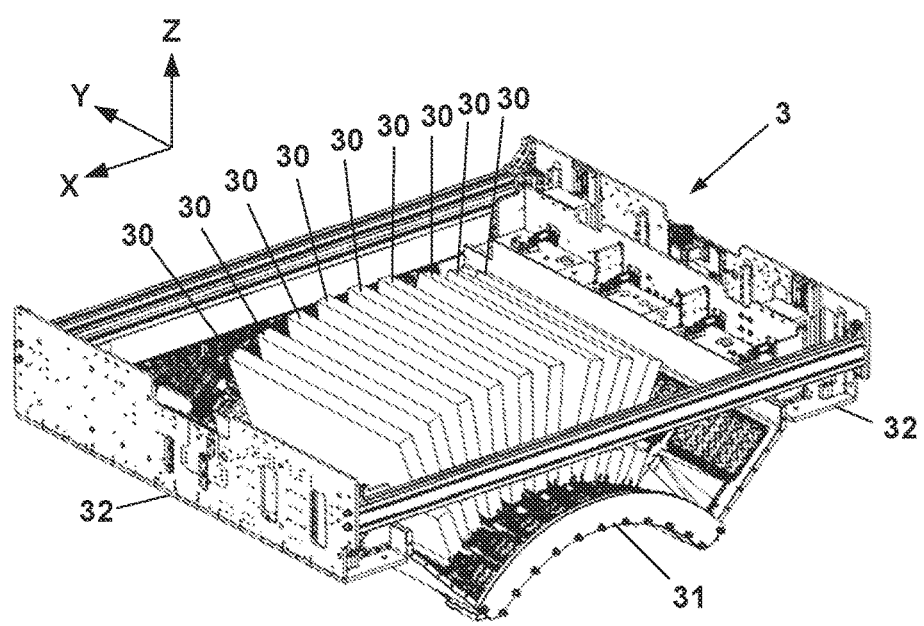
FIG. 2 is a perspective view showing a print unit.

The print unit 3 includes a plurality of printheads 30 and a carriage 31. A description will be made with reference to FIGS. 1 and 2. FIG. 2 is perspective view showing the print unit 3. The printheads 30 discharge liquid ink to the transfer member 2 and form ink images of a printed image on the transfer member 2.

In this embodiment, each printhead 30 is a full-line head elongated in the Y direction, and nozzles are arrayed in a range where they cover the width of an image printing area of a print medium having a usable maximum size. Each printhead 30 has an ink discharge surface with the opened nozzle on its lower surface, and the ink discharge surface faces the surface of the transfer member 2 via a minute gap (for example, several mm). In this embodiment, the transfer member 2 is configured to move on a circular orbit cyclically, and thus the plurality of printheads 30 are arranged radially.

Each nozzle includes a discharge element. The discharge element is, for example, an element that generates a pressure in the nozzle and discharges ink in the nozzle, and the technique of an inkjet head in a well-known inkjet printer is applicable. For example, an element that discharges ink by causing film boiling in ink with an electrothermal transducer and forming a bubble, an element that discharges ink by an electromechanical transducer (piezoelectric element), an element that discharges ink by using static electricity, or the like, can be used as the discharge element. A discharge element that uses the electrothermal transducer can be used from the viewpoint of high-speed and high-density printing.

In this embodiment, nine printheads 30 are provided. The respective printheads 30 discharge different kinds of inks. The different kinds of inks are, for example, different in coloring material and include yellow ink, magenta ink, cyan ink, black ink, and the like. One printhead 30 discharges one kind of ink. However, one printhead 30 may be configured to discharge the plurality of kinds of inks. When the plurality of printheads 30 are thus provided, some of them may discharge ink (for example, clear ink) that does not include a coloring material.

The carriage 31 supports the plurality of printheads 30. The end of each printhead 30 on the side of an ink discharge surface is fixed to the carriage 31. This makes it possible to maintain a gap on the surface between the ink discharge surface and the transfer member 2 more precisely. The carriage 31 is configured to be displaceable while mounting the printheads 30 by the guide of each guide member RL. In this embodiment, the guide members RL are rail members elongated in the Y direction and provided as a pair separately in the X direction. A slide portion 32 is provided on each side of the carriage 31 in the X direction. The slide portions 32 engage with the guide members RL and slide along the guide members RL in the Y direction.

Figure 3:
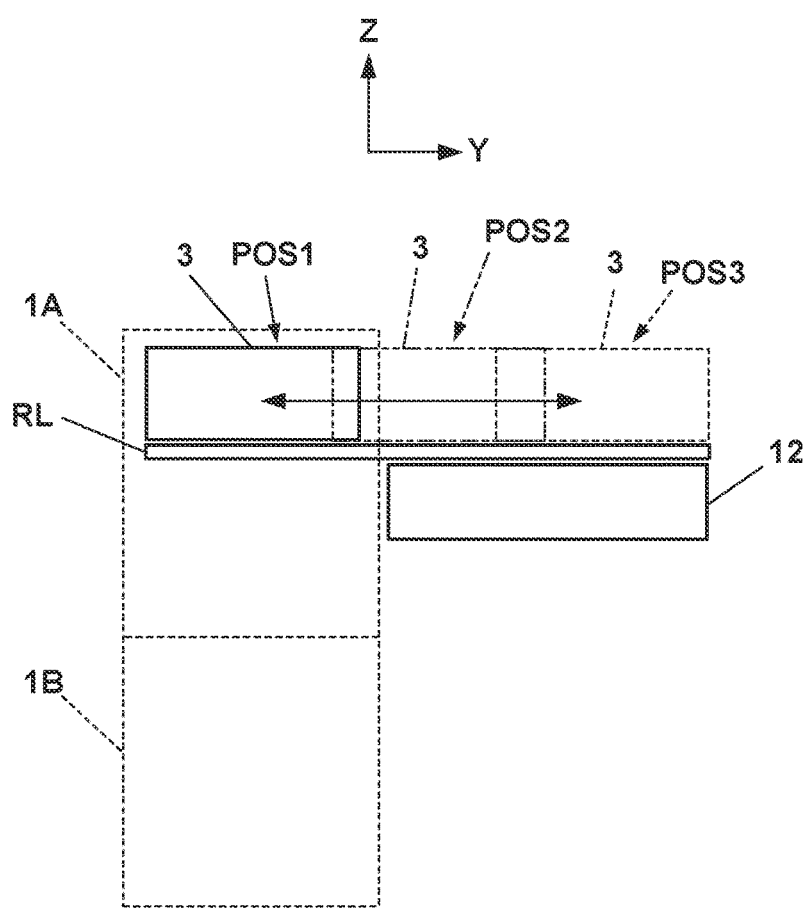
FIG. 3 is an explanatory view showing a displacement mode of the print unit in FIG. 2.

FIG. 3 is a view showing a displacement mode of the print unit 3 and schematically shows the right side surface of the printing system 1. A recovery unit 12 is provided in the rear of the printing system 1. The recovery unit 12 has a mechanism for recovering discharge performance of the printheads 30. For example, a cap mechanism which caps the ink discharge surface of each printhead 30, a wiper mechanism which wipes the ink discharge surface, and a suction mechanism which sucks ink in the printhead 30 by a negative pressure from the ink discharge surface can be used as such mechanisms.

The guide member RL is elongated over the recovery unit 12 from the side of the transfer member 2. By the guide of the guide member RL, the print unit 3 is displaceable between a discharge position POS1, at which the print unit 3 is indicated by a solid line, and a recovery position POS3, at which the print unit 3 is indicated by a broken line, and is moved by a driving mechanism (not shown).

The discharge position POS1 is a position at which the print unit 3 discharges ink to the transfer member 2 and a position at which the ink discharge surface of each printhead 30 faces the surface of the transfer member 2. The recovery position POS3 is a position retracted from the discharge position POS1 and a position at which the print unit 3 is positioned above the recovery unit 12. The recovery unit 12 can perform recovery processing on the printheads 30 when the print unit 3 is positioned at the recovery position POS3. In this embodiment, the recovery unit 12 can also perform the recovery processing in the middle of movement before the print unit 3 reaches the recovery position POS3. There is a preliminary recovery position POS2 between the discharge position POS1 and the recovery position POS3. The recovery unit 12 can perform preliminary recovery processing on the printheads 30 at the preliminary recovery position POS2 while the printheads 30 move from the discharge position POS1 to the recovery position POS3.

<Transfer Unit>

The transfer unit 4 will be described with reference to FIG. 1. The transfer unit 4 includes a transfer drum (transfer cylinder) 41 and a pressurizing drum 42. Each of these drums is a rotating body that rotates about a rotation axis in the Y direction and has a columnar outer peripheral surface. In FIG. 1, arrows shown in respective views of the transfer drum 41 and the pressurizing drum 42 indicate their rotation directions. The transfer drum 41 rotates clockwise, and the pressurizing drum 42 rotates counterclockwise.

The transfer drum 41 is a support member that supports the transfer member 2 on its outer peripheral surface. The transfer member 2 is provided on the outer peripheral surface of the transfer drum 41 continuously or intermittently in a circumferential direction. If the transfer member 2 is provided continuously, it is formed into an endless swath. If the transfer member 2 is provided intermittently, it is formed into swaths with ends dividedly into a plurality of segments. The respective segments can be arranged in an arc at an equal pitch on the outer peripheral surface of the transfer drum 41.

The transfer member 2 moves cyclically on the circular orbit by rotating the transfer drum 41. By the rotational phase of the transfer drum 41, the position of the transfer member 2 can be discriminated into a processing area R1 before discharge, a discharge area R2, processing areas R3 and R4 after discharge, a transfer area R5, and a processing area R6 after transfer. The transfer member 2 passes through these areas cyclically.

The processing area R1 before discharge is an area where preprocessing is performed on the transfer member 2 before the print unit 3 discharges ink and an area where the peripheral unit 5A performs processing. In this embodiment, a reactive liquid is applied. The discharge area R2 is a formation area where the print unit 3 forms an ink image by discharging ink to the transfer member 2. The processing areas R3 and R4 after discharge are processing areas where processing is performed on the ink image after ink discharge. The processing area R3 after discharge is an area where the peripheral unit 5B performs processing, and the processing area R4 after discharge is an area where the peripheral unit 5C performs processing. The transfer area R5 is an area where the transfer unit 4 transfers the ink image on the transfer member 2 to the print medium P. The processing area R6 after transfer is an area where post processing is performed on the transfer member 2 after transfer and an area where the peripheral unit 5D performs processing.

In this embodiment, the discharge area R2 is an area with a predetermined section. The other areas R1 and R3 to R6 have narrower sections than the discharge area R2. Comparing to the face of a clock, in this embodiment, the processing area R1 before discharge is positioned at almost 10 o'clock, the discharge area R2 is in a range from almost 11 o'clock to 1 o'clock, the processing area R3 after discharge is positioned at almost 2 o'clock, and the processing area R4 after discharge is positioned at almost 4 o'clock. The transfer area R5 is positioned at almost 6 o'clock, and the processing area R6 after transfer is an area at almost 8 o'clock.

The transfer member 2 may be formed by a single layer but may be an accumulative body of a plurality of layers. If the transfer member 2 is formed by the plurality of layers, it may include three layers of, for example, a surface layer, an elastic layer, and a compressed layer. The surface layer is an outermost layer having an image formation surface where the ink image is formed. By providing the compressed layer, the compressed layer absorbs deformation and disperses a local pressure fluctuation, making it possible to maintain transferability even at the time of high-speed printing. The elastic layer is a layer between the surface layer and the compressed layer.

As a material for the surface layer, various materials, such as a resin and a ceramic can be used appropriately. In respect of durability or the like, however, a material high in compressive modulus can be used. More specifically, an acrylic resin, an acrylic silicone resin, a fluoride-containing resin, a condensate obtained by condensing a hydrolyzable organo-silicon compound, and the like can be used. The surface layer that has undergone a surface treatment may be used in order to improve wettability of the reactive liquid, the transferability of an image, or the like. Frame processing, a corona treatment, a plasma treatment, a polishing treatment, a roughing treatment, an active energy beam irradiation treatment, an ozone treatment, a surfactant treatment, a silane coupling treatment, or the like, can be used as the surface treatment. A plurality of the surface treatments may be combined. It is also possible to provide any desired surface shape in the surface layer.

For example, acrylonitrile-butadiene rubber, acrylic rubber, chloroprene rubber, urethane rubber, silicone rubber, or the like can be used as a material for the compressed layer. When such a rubber material is formed, a porous rubber material may be formed by blending a predetermined amount of a vulcanizing agent, vulcanizing accelerator, or the like, and further blending a foaming agent, or a filling agent, such as hollow fine particles or salt, as needed. Consequently, a bubble portion is compressed along with a volume change with respect to various pressure fluctuations, and thus, deformation in directions other than a compression direction is small, making it possible to obtain more stable transferability and durability. As the porous rubber material, there are a material having an open cell structure, in which respective pores continue to each other, and a material having a closed cell structure, in which the respective pores are independent of each other. However, either structure may be used, or both of these structures may be used.

As a member for the elastic layer, the various materials such as the resin and the ceramic can be used appropriately. In respect of processing characteristics, various materials of an elastomer material and a rubber material can be used. More specifically, for example, fluorosilicone rubber, phenyl silicone rubber, fluorine rubber, chloroprene rubber, urethane rubber, nitrile rubber, and the like, can be used. In addition, ethylene propylene rubber, natural rubber, styrene rubber, isoprene rubber, butadiene rubber, the copolymer of ethylene/propylene/butadiene, nitrile-butadiene rubber, and the like, can be used. In particular, silicone rubber, fluorosilicone rubber, and phenyl silicon rubber are advantageous in terms of dimensional stability and durability because of their small compression set. They are also advantageous in terms of transferability because of their small elasticity change by a temperature.

Between the surface layer and the elastic layer and between the elastic layer and the compressed layer, various adhesives or double-sided adhesive tapes can also be used in order to fix them to each other. The transfer member 2 may also include a reinforce layer high in compressive modulus in order to suppress elongation in a horizontal direction or maintain resilience when attached to the transfer drum 41. Woven fabric may be used as a reinforce layer. The transfer member 2 can be manufactured by combining the respective layers formed by the materials described above in any desired manner.

The outer peripheral surface of the pressurizing drum 42 is pressed against the transfer member 2. At least one grip mechanism which grips the leading edge portion of the print medium P is provided on the outer peripheral surface of the pressurizing drum 42. A plurality of grip mechanisms may be provided separately in the circumferential direction of the pressurizing drum 42. The ink image on the transfer member 2 is transferred to the print medium P when it passes through a nip portion between the pressurizing drum 42 and the transfer member 2 while being conveyed in tight contact with the outer peripheral surface of the pressurizing drum 42.

The transfer drum 41 and the pressurizing drum 42 can share a driving source such as a motor that drives them, and a driving force can be delivered by a transmission mechanism such as a gear mechanism.

<Peripheral Unit>

The peripheral units 5A to 5D are arranged around the transfer drum 41. In this embodiment, the peripheral units 5A to 5D are specifically an application unit, an absorption unit, a heating unit, and a cleaning unit in order.

The application unit 5A is a mechanism which applies the reactive liquid onto the transfer member 2 before the print unit 3 discharges ink. The reactive liquid is a liquid that contains a component increasing an ink viscosity. An increase in ink viscosity here means that a coloring material, a resin, and the like that form the ink react chemically or suck physically by contacting the component that increases the ink viscosity, recognizing the increase in ink viscosity. This increase in ink viscosity includes not only a case in which an increase in viscosity of entire ink is recognized but also a case in which a local increase in viscosity is generated by coagulating some of components such as the coloring material and the resin that form the ink.

The component that increases the ink viscosity can use, without particular limitation, a substance, such as metal ions or a polymeric coagulant, that causes a pH change in ink and coagulates the coloring material in the ink, and can use an organic acid. For example, a roller, a printhead, a die coating apparatus (die coater), a blade coating apparatus (blade coater), or the like, can be used as a mechanism which applies the reactive liquid. If the reactive liquid is applied to the transfer member 2 before the ink is discharged to the transfer member 2, it is possible to immediately fix ink that reaches the transfer member 2. This makes it possible to suppress bleeding caused by mixing adjacent inks.

The absorption unit 5B is a mechanism which absorbs a liquid component from the ink image on the transfer member 2 before transfer. It is possible to suppress, for example, a blur of an image printed on the print medium P by decreasing the liquid component of the ink image. Describing a decrease in liquid component from another point of view, it is also possible to represent it as condensing ink that forms the ink image on the transfer member 2. Condensing the ink means increasing the content of a solid content such as a coloring material or a resin included in the ink with respect to the liquid component by decreasing the liquid component included in the ink.

The absorption unit 5B includes, for example, a liquid absorbing member that decreases the amount of the liquid component of the ink image by contacting the ink image. The liquid absorbing member may be formed on the outer peripheral surface of the roller or may be formed into an endless sheet-like shape and run cyclically. In terms of protection of the ink image, the liquid absorbing member may be moved in synchronism with the transfer member 2 by making the moving speed of the liquid absorbing member equal to the peripheral speed of the transfer member 2.

The liquid absorbing member may include a porous body that contacts the ink image. The pore size of the porous body on the surface that contacts the ink image may be equal to or smaller than 10 µm in order to suppress adherence of an ink solid content to the liquid absorbing member. The pore size here refers to an average diameter and can be measured by a known means, such as a mercury intrusion technique, a nitrogen adsorption method, an SEM image observation, or the like. Note that the liquid component does not have a fixed shape, and is not particularly limited if it has fluidity and an almost constant volume. For example, water, an organic solvent, or the like contained in the ink or reactive liquid can be used as the liquid component.

The heating unit 5C is a mechanism which heats the ink image on the transfer member 2 before transfer. A resin in the ink image melts by heating the ink image, improving transferability to the print medium P. A heating temperature can be equal to or higher than the minimum film forming temperature (MFT) of the resin. The MFT can be measured by each apparatus that complies with a generally known method such as JIS K 6828-2: 2003 or ISO 2115: 1996. From the viewpoint of transferability and image robustness, the ink image may be heated at a temperature higher than the MFT by 10° C. or higher, or may further be heated at a temperature higher than the MFT by 20° C. or higher. The heating unit 5C can use a known heating device, for example, various lamps such as infrared rays, a warm air fan, or the like. An infrared heater can be used in terms of heating efficiency.

The cleaning unit 5D is a mechanism which cleans the transfer member 2 after transfer. The cleaning unit 5D removes ink remaining on the transfer member 2, dust on the transfer member 2, or the like. The cleaning unit 5D can use a known method, for example, a method of bringing a porous member into contact with the transfer member 2, a method of scraping the surface of the transfer member 2 with a brush, a method of scratching the surface of the transfer member 2 with a blade, or the like as needed. A known shape such as a roller shape or a web shape can be used for a cleaning member used for cleaning.

As described above, in this embodiment, the application unit 5A, the absorption unit 5B, the heating unit 5C, and the cleaning unit 5D are included as the peripheral units. However, cooling functions of the transfer member 2 may be applied, or cooling units may be added to these units. In this embodiment, the temperature of the transfer member 2 may be increased by heat of the heating unit 5C. If the ink image exceeds the boiling point of water as a prime solvent of ink after the print unit 3 discharges ink to the transfer member 2, performance of liquid component absorption by the absorption unit 5B may be degraded. It is possible to maintain the performance of liquid component absorption by cooling the transfer member 2 such that the temperature of the discharged ink is maintained below the boiling point of water.

The cooling unit may be an air blowing mechanism which blows air to the transfer member 2, or a mechanism which brings a member (for example, a roller) into contact with the transfer member 2 and cools this member by air-cooling or water-cooling. The cooling unit may be a mechanism which cools the cleaning member of the cleaning unit 5D. A cooling timing may be a period before application of the reactive liquid after transfer.

<Supply Unit>

The supply unit 6 is a mechanism which supplies ink to each printhead 30 of the print unit 3. The supply unit 6 may be provided on the rear side of the printing system 1. The supply unit 6 includes a reservoir TK that reserves ink for each kind of ink. Each reservoir TK may be made of a main tank and a sub tank. Each reservoir TK and a corresponding one of the printheads 30 communicate with each other by a liquid passageway 6a, and ink is supplied from the reservoir TK to the printhead 30. The liquid passageway 6a may circulate ink between the reservoirs TK and the printheads 30. The supply unit 6 may include, for example, a pump that circulates ink. A deaerating mechanism which deaerates bubbles in ink may be provided in the middle of the liquid passageway 6a or in each reservoir TK. A valve that adjusts the fluid pressure of ink and an atmospheric pressure may be provided in the middle of the liquid passageway 6a or in each reservoir TK. The heights of each reservoir TK and each printhead 30 in the Z direction may be designed such that the liquid surface of ink in the reservoir TK is positioned lower than the ink discharge surface of the printhead 30.

<Conveyance Apparatus>

The conveyance apparatus 1B is an apparatus that feeds the print medium P to the transfer unit 4 and discharges, from the transfer unit 4, the printed product P' to which the ink image was transferred. The conveyance apparatus 1B includes a feeding unit 7, a plurality of conveyance drums 8 and 8a, two sprockets 8b, a chain 8c, and a collection unit 8d. In FIG. 1, an arrow inside a view of each constituent element in the conveyance apparatus 1B indicates a rotation direction of the constituent element, and an arrow outside the view of each constituent element indicates a conveyance path of the print medium P or the printed product P'. The print medium P is conveyed from the feeding unit 7 to the transfer unit 4, and the printed product P' is conveyed from the transfer unit 4 to the collection unit 8d. The side of the feeding unit 7 may be referred to as an upstream side in a conveyance direction, and the side of the collection unit 8d may be referred to as a downstream side.

The feeding unit 7 includes a stacking unit where the plurality of print media P are stacked and a feeding mechanism which feeds the print media P one by one from the stacking unit to the most upstream conveyance drum 8. Each of the conveyance drums 8 and 8a is a rotating body that rotates about the rotation axis in the Y direction and has a columnar outer peripheral surface. At least one grip mechanism which grips the leading edge portion of the print medium P (printed product P') is provided on the outer peripheral surface of each of the conveyance drums 8 and 8a. A gripping operation and release operation of each grip mechanism may be controlled such that the print medium P is transferred between the adjacent conveyance drums.

The two conveyance drums 8a are used to reverse the print medium P. When the print medium P undergoes double-side printing, it is not transferred to the conveyance drum 8 adjacent on the downstream side but transferred to the conveyance drums 8a from the pressurizing drum 42 after transfer onto the surface. The print medium P is reversed via the two conveyance drums 8a and transferred to the pressurizing drum 42 again via the conveyance drums 8 on the upstream side of the pressurizing drum 42. Consequently, the reverse surface of the print medium P faces the transfer drum 41, transferring the ink image to the reverse surface.

The chain 8c is wound between the two sprockets 8b. One of the two sprockets 8b is a driving sprocket, and the other is a driven sprocket. The chain 8c runs cyclically by rotating the driving sprocket. The chain 8c includes a plurality of grip mechanisms spaced apart from each other in its longitudinal direction. Each grip mechanism grips the end of the printed product P'. The printed product P' is transferred from the conveyance drum 8 positioned at a downstream end to each grip mechanism of the chain 8c, and the printed product P' gripped by the grip mechanism is conveyed to the collection unit 8d by running the chain 8c, releasing gripping. Consequently, the printed product P' is stacked in the collection unit 8d.

<Post Processing Unit>

The conveyance apparatus 1B includes post processing units 10A and 10B. The post processing units 10A and 10B are mechanisms which are arranged on the downstream side of the transfer unit 4, and perform post processing on the printed product P'. The post processing unit 10A performs processing on the obverse surface of the printed product P', and the post processing unit 10B performs processing on the reverse surface of the printed product P'. The contents of the post processing includes, for example, coating that aims at protection, improving glossiness, and the like, of an image on the image printed surface of the printed product P'. For example, liquid application, sheet welding, lamination, and the like can be used as an example of coating.

<Inspection Unit>

The conveyance apparatus 1B includes inspection units 9A and 9B. The inspection units 9A and 9B are mechanisms which are arranged on the downstream side of the transfer unit 4, and inspect the printed product P'.

In this embodiment, the inspection unit 9A is an image capturing apparatus that captures an image printed on the printed product P' and includes an image sensor, for example, a CCD sensor, a CMOS sensor, or the like. The inspection unit 9A captures a printed image while a printing operation is performed continuously. Based on the image captured by the inspection unit 9A, it is possible to confirm a temporal change in tint or the like of the printed image and determine whether to correct image data or print data. In this embodiment, the inspection unit 9A has an imaging range set on the outer peripheral surface of the pressurizing drum 42 and is arranged to be able to partially capture the printed image immediately after transfer. The inspection unit 9A may inspect all printed images or may inspect the images every predetermined sheets.

In this embodiment, the inspection unit 9B is also an image capturing apparatus that captures an image printed on the printed product P' and includes an image sensor, for example, a CCD sensor, a CMOS sensor, or the like. The inspection unit 9B captures a printed image in a test printing operation. The inspection unit 9B can capture the entire printed image. Based on the image captured by the inspection unit 9B, it is possible to perform basic settings for various correction operations regarding print data. In this embodiment, the inspection unit 9B is arranged at a position to capture the printed product P' conveyed by the chain 8c. When the inspection unit 9B captures the printed image, it captures the entire image by temporarily suspending the run of the chain 8c. The inspection unit 9B may be a scanner that scans the printed product P'.

<Control Unit>

Figure 4:
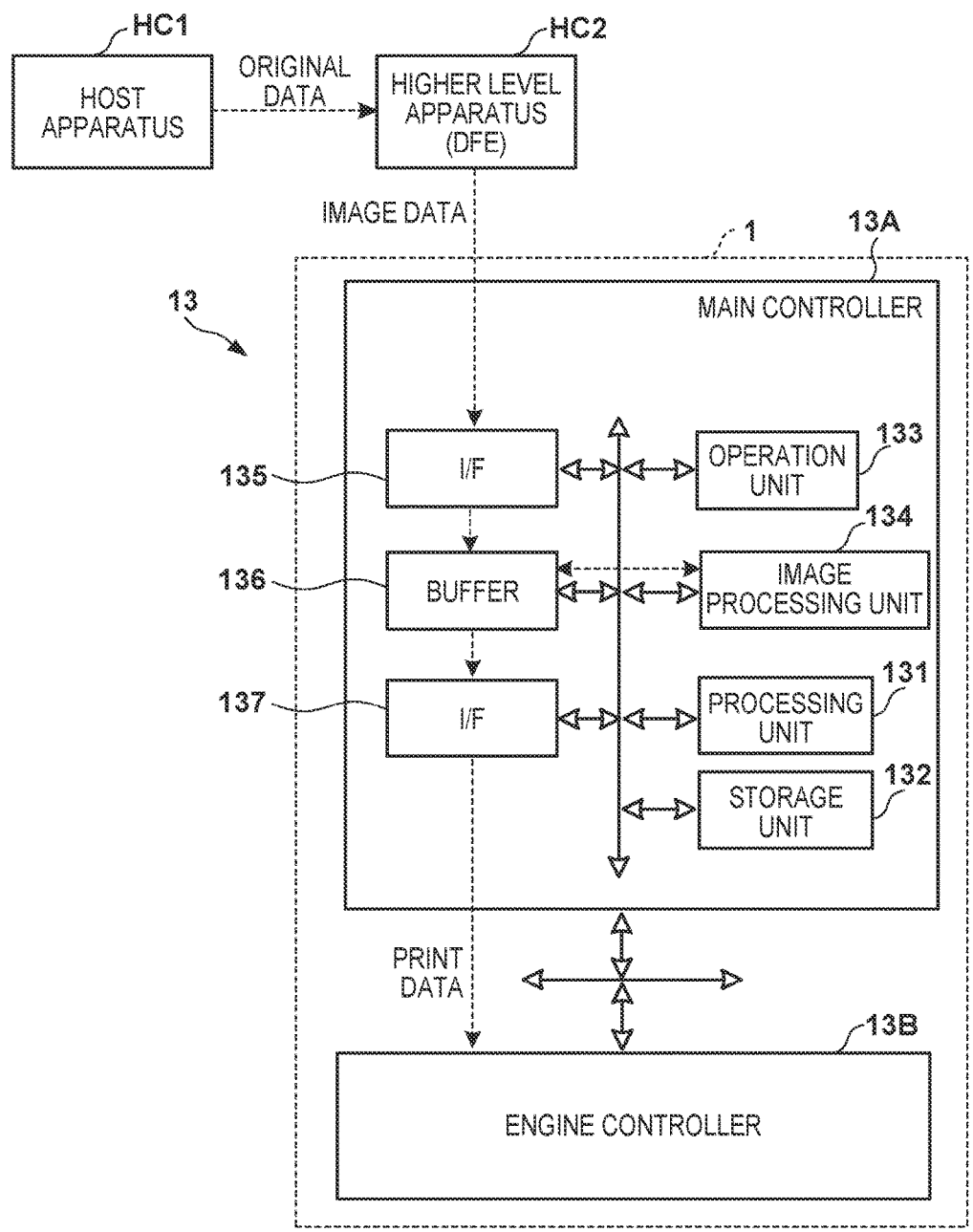
FIG. 4 is a block diagram showing a control system of the printing system in FIG. 1.
Figure 5:
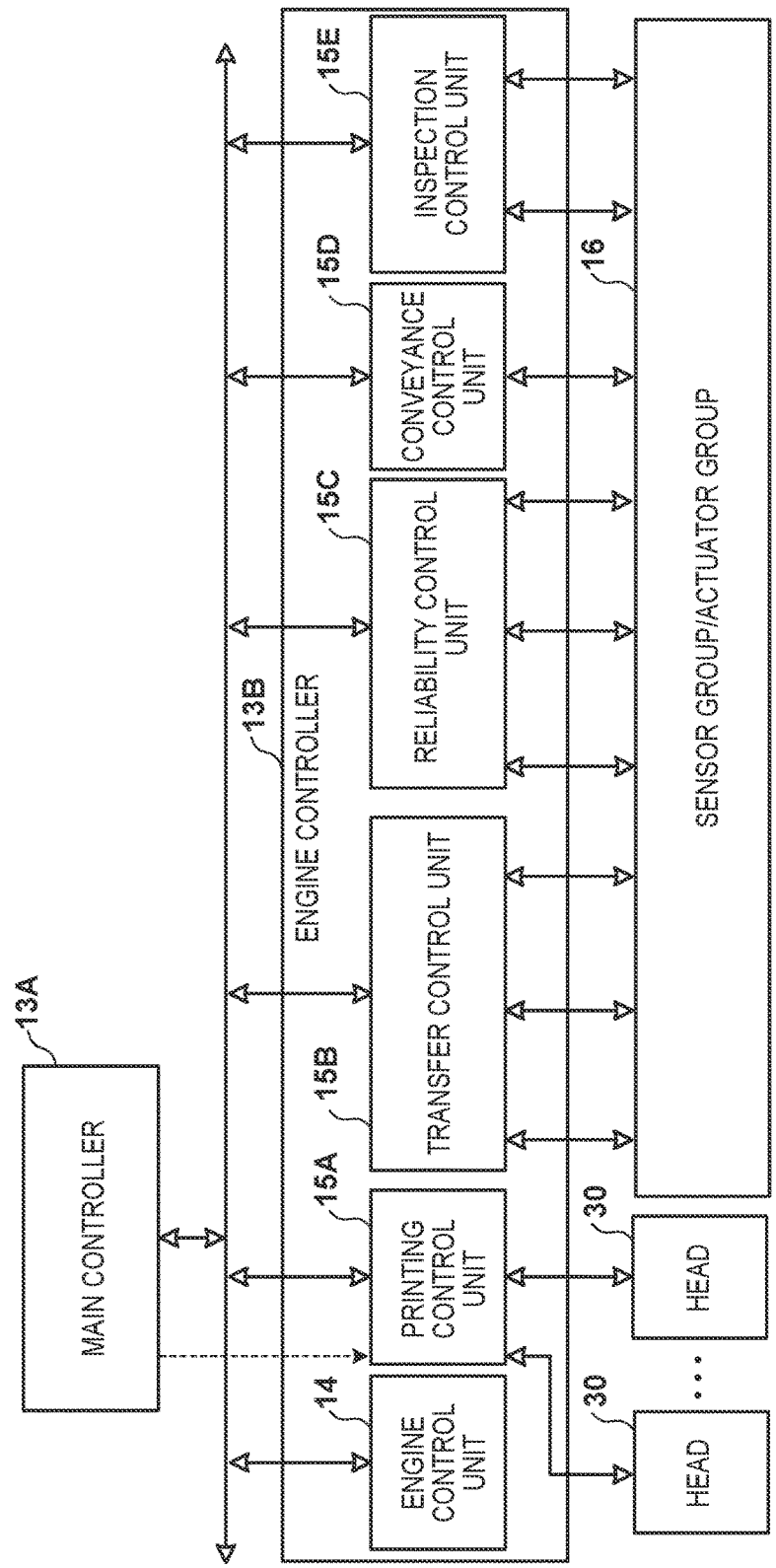
FIG. 5 is a block diagram showing the control system of the printing system in FIG. 1.

A control unit of the printing system 1 will be described next. FIGS. 4 and 5 are block diagrams each showing a control unit 13 of the printing system 1. The control unit 13 is communicably connected to a higher level apparatus (DFE) HC2, and the higher level apparatus HC2 is communicably connected to a host apparatus HC1.

Original data to be the source of a printed image is generated or saved in the host apparatus HC1. The original data here is generated in the format of, for example, an electronic file such as a document file or an image file. This original data is transmitted to the higher level apparatus HC2. In the higher level apparatus HC2, the received original data is converted into a data format (for example, RGB data that represents an image by RGB) available by the control unit 13. The converted data is transmitted from the higher level apparatus HC2 to the control unit 13 as image data. The control unit 13 starts a printing operation based on the received image data.

In this embodiment, the control unit 13 is roughly divided into a main controller 13A and an engine controller 13B. The main controller 13A includes a processing unit 131, a storage unit 132, an operation unit 133, an image processing unit 134, a communication I/F (interface) 135, a buffer 136, and a communication I/F 137.

The processing unit 131 is a processor such as a CPU, executes programs stored in the storage unit 132, and controls the entire main controller 13A. The storage unit 132 is a storage device such as a RAM, a ROM, a hard disk, or an SSD, stores data and the programs executed by the processing unit (CPU) 131, and provides the processing unit (CPU) 131 with a work area. The operation unit 133 is, for example, an input device such as a touch panel, a keyboard, or a mouse and accepts a user instruction.

The image processing unit 134 is, for example, an electronic circuit including an image processing processor. The buffer 136 is, for example, a RAM, a hard disk, or an SSD. The communication I/F 135 communicates with the higher level apparatus HC2, and the communication I/F 137 communicates with the engine controller 13B. In FIG. 4, broken-line arrows exemplify the processing sequence of image data. Image data received from the higher level apparatus HC2 via the communication I/F 135 is accumulated in the buffer 136. The image processing unit 134 reads out the image data from the buffer 136, performs predetermined image processing on the readout image data, and stores the processed data in the buffer 136 again. The image data after the image processing stored in the buffer 136 is transmitted from the communication I/F 137 to the engine controller 13B as print data used by a print engine.

As shown in FIG. 5, the engine controller 13B includes control units 14 and 15A to 15E, and obtains a detection result of a sensor group/actuator group 16 of the printing system 1 and controls driving of the groups. Each of these control units includes a processor such as a CPU, a storage device such as a RAM or a ROM, and an interface with an external device. Note that the division of the control units is merely illustrative, and a plurality of subdivided control units may perform some of control operations or conversely, the plurality of control units may be integrated with each other, and one control unit may be configured to implement their control contents.

The engine control unit 14 controls the entire engine controller 13B. The printing control unit 15A converts print data received from the main controller 13A into raster data or the like in a data format suitable for driving of the printheads 30. The printing control unit 15A controls discharge of each printhead 30.

The transfer control unit 15B controls the application unit 5A, the absorption unit 5B, the heating unit 5C, and the cleaning unit 5D.

The reliability control unit 15C controls the supply unit 6, the recovery unit 12, and a driving mechanism which moves the print unit 3 between the discharge position POS1 and the recovery position POS3.

The conveyance control unit 15D controls driving of the transfer unit 4 and controls the conveyance apparatus 1B. The inspection control unit 15E controls the inspection unit 9B and the inspection unit 9A.

Of the sensor group/actuator group 16, the sensor group includes a sensor that detects the position and speed of a movable part, a sensor that detects a temperature, an image sensor, and the like. The actuator group includes a motor, an electromagnetic solenoid, an electromagnetic valve, and the like.

<Operation Example>

Figure 6:
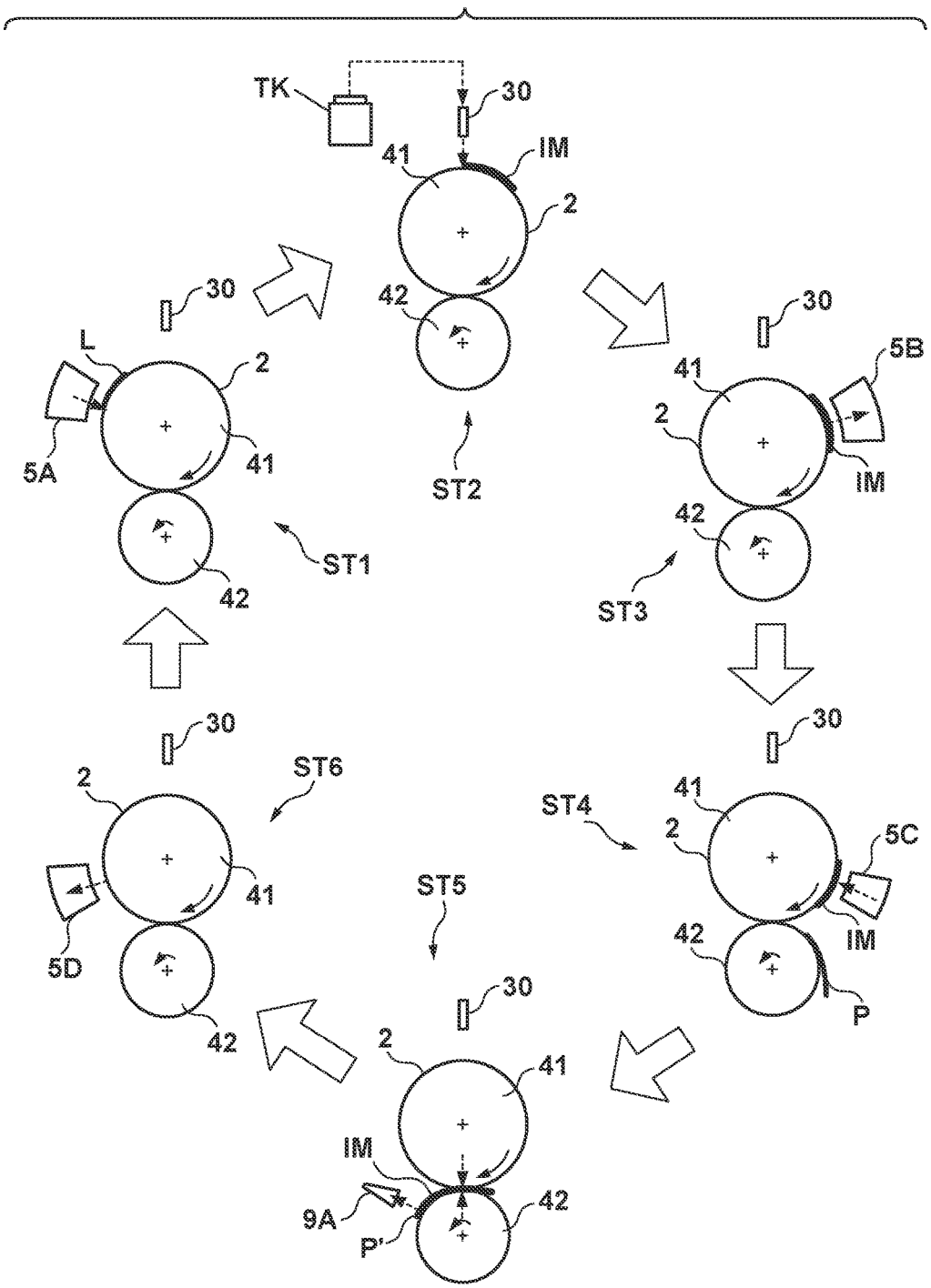
FIG. 6 is an explanatory view showing an example of the operation of the printing system in FIG. 1.

FIG. 6 is a view schematically showing an example of a printing operation. Respective steps below are performed cyclically while rotating the transfer drum 41 and the pressurizing drum 42. As shown in a state ST1, first, a reactive liquid L is applied from the application unit 5A onto the transfer member 2. A portion to which the reactive liquid L on the transfer member 2 is applied moves along with the rotation of the transfer drum 41. When the portion to which the reactive liquid L is applied reaches under the printhead 30, ink is discharged from the printhead 30 to the transfer member 2 as shown in a state ST2. Consequently, an ink image IM is formed. At this time, the discharged ink mixes with the reactive liquid L on the transfer member 2, promoting coagulation of the coloring materials. The discharged ink is supplied from the reservoir TK of the supply unit 6 to the printhead 30.

The ink image IM on the transfer member 2 moves along with the rotation of the transfer member 2. When the ink image IM reaches the absorption unit 5B, as shown in a state ST3, the absorption unit 5B absorbs a liquid component from the ink image IM. When the ink image IM reaches the heating unit 5C, as shown in a state ST4, the heating unit 5C heats the ink image IM, a resin in the ink image IM melts, and a film of the ink image IM is formed. In synchronism with such formation of the ink image IM, the conveyance apparatus 1B conveys the print medium P.

As shown in a state ST5, the ink image IM and the print medium P reach the nip portion between the transfer member 2 and the pressurizing drum 42, the ink image IM is transferred to the print medium P, and the printed product P' is formed. Passing through the nip portion, the inspection unit 9A captures an image printed on the printed product P' and inspects the printed image. The conveyance apparatus 1B conveys the printed product P' to the collection unit 8*d*.

When a portion where the ink image IM on the transfer member 2 is formed reaches the cleaning unit 5D, it is cleaned by the cleaning unit 5D as shown in a state ST6. After the cleaning, the transfer member 2 rotates once, and transfer of the ink image to the print medium P is performed repeatedly in the same procedure. The description above has been given such that transfer of the ink image IM to one print medium P is performed once in one rotation of the transfer member 2 for the sake of easy understanding. It is possible, however, to continuously perform transfer of the ink image IM to the plurality of print media P in one rotation of the transfer member 2.

Figure 7:
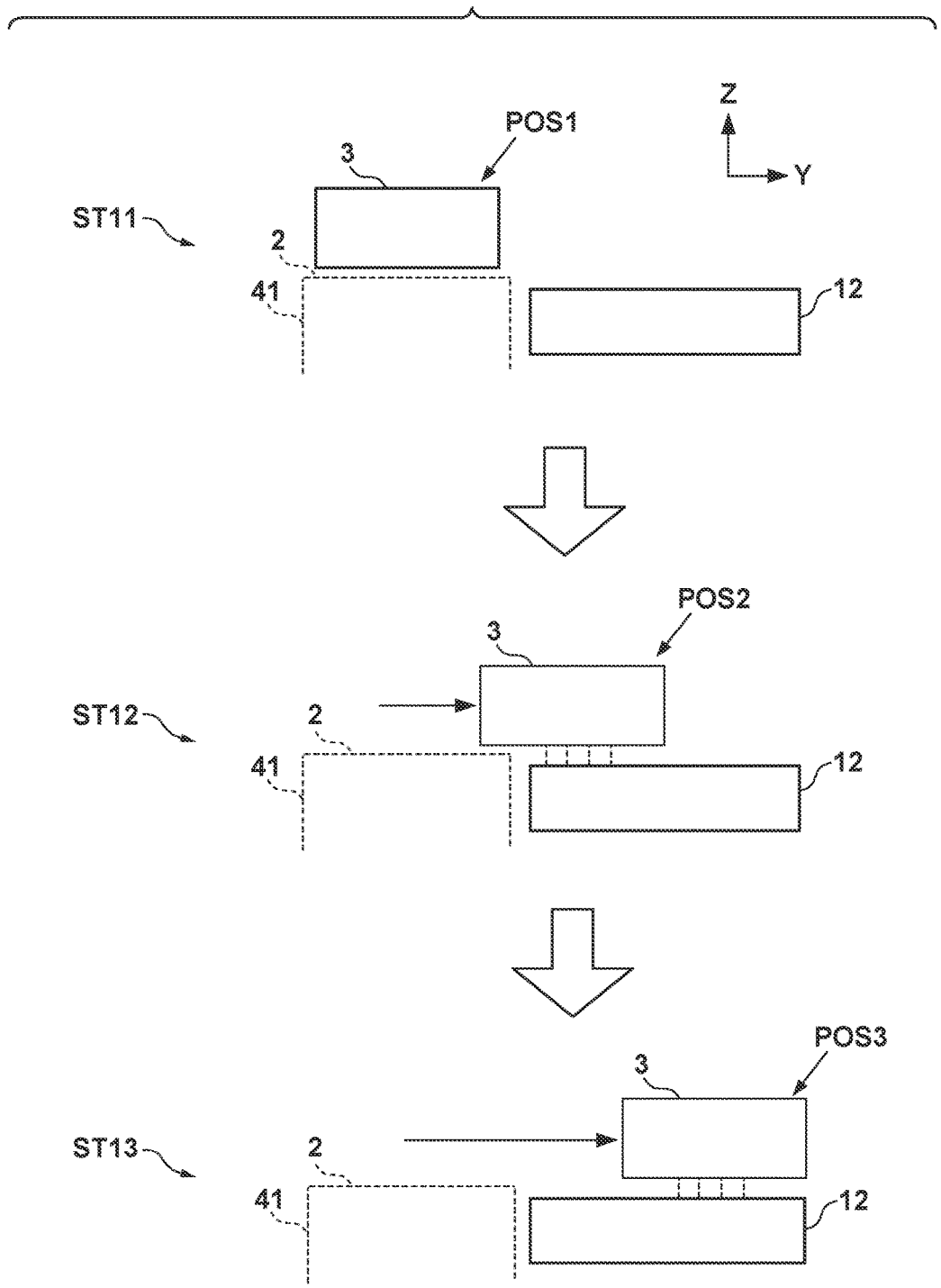
FIG. 7 is an explanatory view showing an example of the operation of the printing system in FIG. 1.

Each printhead 30 needs maintenance if such a printing operation continues. FIG. 7 shows an operation example at the time of maintenance of each printhead 30. A state ST11 shows a state in which the print unit 3 is positioned at the discharge position POS1. A state ST12 shows a state in which the print unit 3 passes through the preliminary recovery position POS2. Under passage, the recovery unit 12 performs a process of recovering discharge performance of each printhead 30 of the print unit 3. Subsequently, as shown in a state ST13, the recovery unit 12 performs the process of recovering the discharge performance of each printhead 30 in a state in which the print unit 3 is positioned at the recovery position POS3.

<Absorption Unit>

Figure 8:
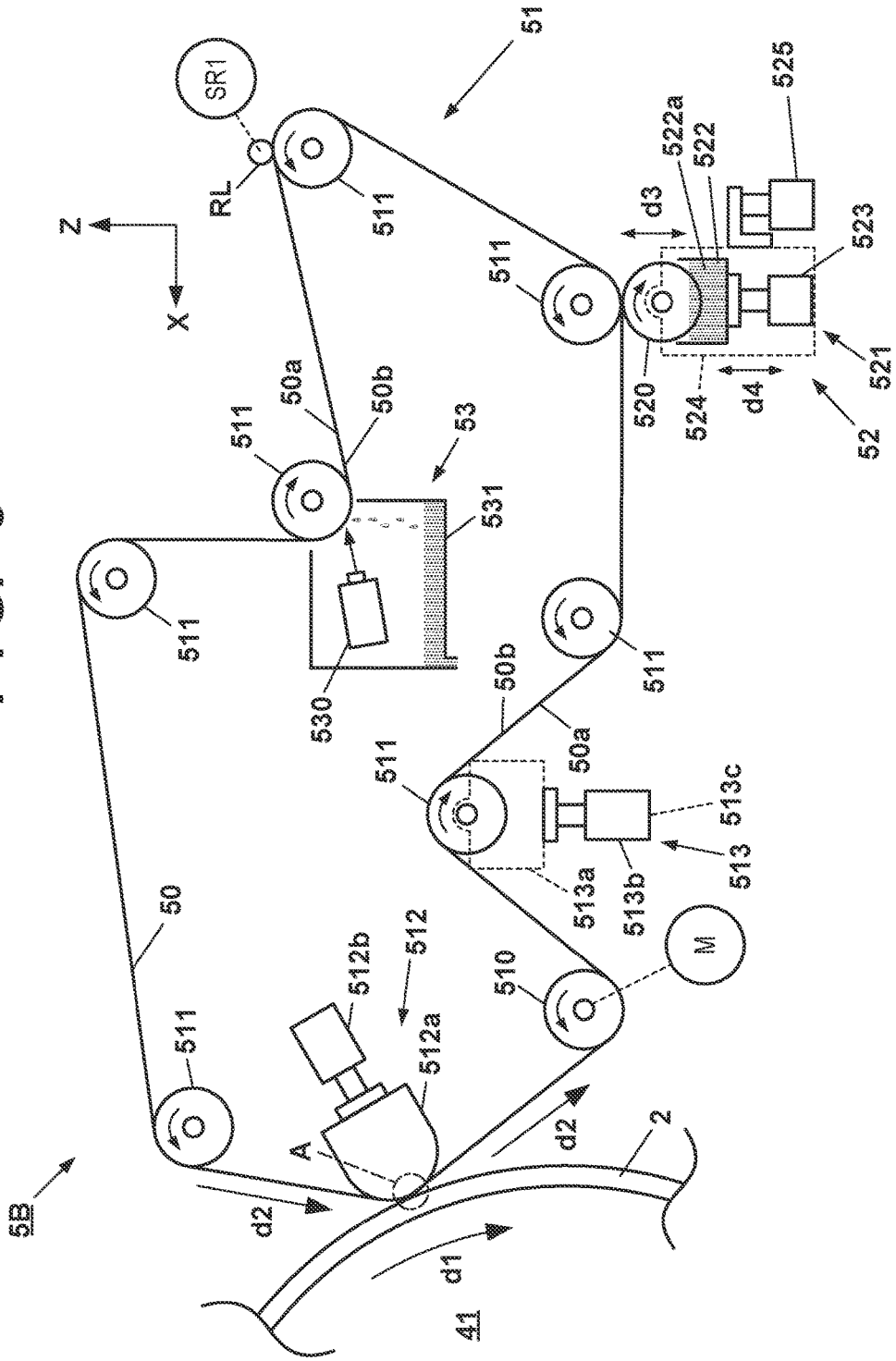
FIG. 8 is a schematic view showing an absorption unit.
Figure 9:
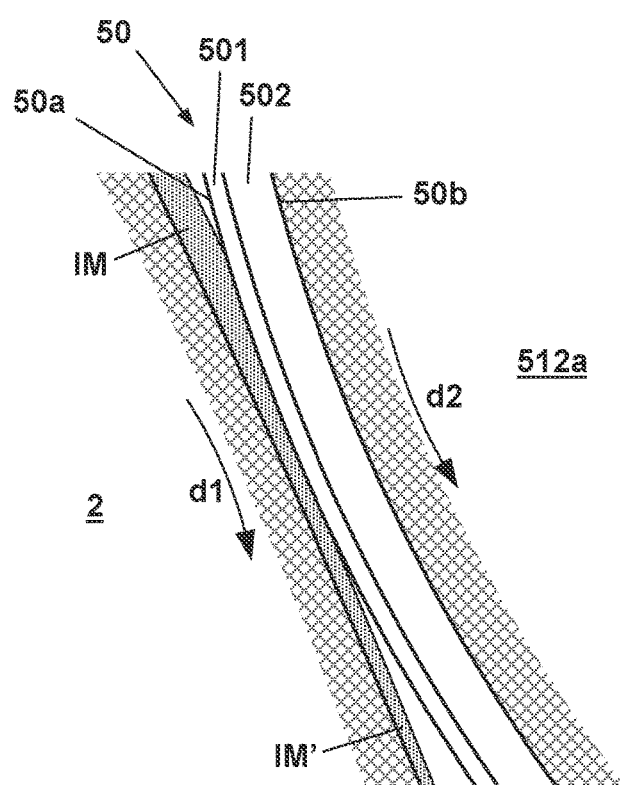
FIG. 9 is an enlarged view showing a portion A in FIG. 8.

A detailed example of the absorption unit 5B will be described with reference to FIGS. 8 and 9. FIG. 8 is a schematic view showing an example of the absorption unit 5B. FIG. 9 is an enlarged view showing a portion A in FIG. 8. The absorption unit 5B is a liquid absorbing apparatus that absorbs a liquid component from the ink image IM formed on the transfer member 2 before the ink image IM is transferred to the print medium P. When the aqueous pigment ink is used as in this embodiment, the absorption unit 5B mainly aims at absorbing water in the ink image. This makes it possible to suppress occurrence of a curl or cockling of the print medium P.

The absorption unit 5B includes a liquid absorbing member 50, a support unit 51 that supports the liquid absorbing member 50 to be movable cyclically, and a plurality of kinds of recovery units 52 and 53.

The liquid absorbing member 50 is an absorber that absorbs the liquid component from the ink image IM and is formed into an endless swath of a sheet in the example of FIG. 8. The liquid absorbing member 50 may be formed by a single layer but is formed by a plurality of layers in this embodiment. FIG. 9 shows a liquid absorbing portion of the liquid absorbing member 50 with respect to the ink image IM, and shows a portion where the liquid absorbing member 50 gets closest to the transfer member 2. An arrow d1 indicates the moving direction of the transfer member 2, and an arrow d2 indicates the moving direction of the liquid absorbing member 50.

In this embodiment, the liquid absorbing member 50 has a two-layered structure of an obverse layer 501 and a reverse layer 502 but may have a structure of three or more layers. The obverse layer 501 forms a surface 50*a* contacting the ink image IM, and the reverse layer 502 forms an opposite surface 50*b*. The liquid absorbing member 50 absorbs the liquid component of the ink image IM on the transfer member 2. The liquid component of the ink image IM penetrates from the obverse layer 501 to the liquid absorbing member 50 and further penetrates to the reverse layer 502. The ink image IM is changed to an ink image IM' with a decreased liquid component and moves toward the heating unit 5C.

Each of the obverse layer 501 and the reverse layer 502 can be made of a porous material. The average pore size of the obverse layer 501 can be made smaller than that of the reverse layer 502 in that performance of absorbing the liquid component is increased while suppressing adherence of the coloring material.

A material for the obverse layer 501 may be, for example, a hydrophilic material whose contact angle with respect to water is less than 90° or a water-repellent material whose contact angle with respect to water is 90° or more. For the hydrophilic material, the material may have the contact angle with respect to water to be 40° or less. The contact angle may be measured complying with a technique described in, for example, "6. static method" of JIS R3257.

The hydrophilic material has an effect of drawing up a liquid by a capillary force. Cellulose, polyacrylamide, or a composite material of these can be used as the hydrophilic material. When the water-repellent material is used, a hydrophilic treatment may be performed on its surface. A method, such as sputter etching, can be used as the hydrophilic treatment.

For example, a fluorine resin can be used as the water-repellent material. For example, polytetrafluoroethylene, polychlorotrifluoroethylene, polyvinylidene fluoride, or the like, can be used as the fluorine resin. A time may be taken until the effect of drawing up the liquid is exerted when the water-repellent material is used for the obverse layer 501. To cope with this, a liquid whose contact angle with the obverse layer 501 is less than 90° may be impregnated into the obverse layer 501.

For example, resin-fiber nonwoven fabric or woven fabric can be used as a material for the reverse layer 502. The material for the reverse layer 502 may have the contact angle of water equal to or larger than that for the obverse layer 501 because the liquid component does not flow backward from the reverse layer 502 to the obverse layer 501. For example, polyolefin, polyurethane, polyamide such as nylon, polyester, polysulfone, or a composite material of these materials can be used as the material for the reverse layer 502.

For example, adhesive lamination, thermal lamination, or the like can be used as an accumulative method of the obverse layer 501 and the reverse layer 502.

The support unit 51 is a mechanism that supports the liquid absorbing member 50 to be able to run cyclically and includes a driving rotating member 510, a plurality of driven rotating members 511, and a position adjustment mechanism 512. The driving rotating member 510 and the driven rotating members 511 are rollers or pulleys around which the swath liquid absorbing member 50 is wound, and are rotatably supported about an axis in the Y direction.

The driving rotating member 510 rotates by a driving force of a motor M and runs the liquid absorbing member 50. Note that in this embodiment, the support unit 51 is configured to include the driving rotating member 510. However, the driving rotating member 510 may be omitted so that the support unit 51 includes only the driven rotating members 511. In this arrangement, it is possible to run the liquid absorbing member 50 by pressing the liquid absorbing member 50 against the transfer member 2 and using the rotating force of the transfer member 2.

The driven rotating members 511 are supported freely and rotatably. In this embodiment, seven driven rotating members 511 are provided, and these driven rotating members 511 and the driving rotating member 510 delimit a moving path (running track) of the liquid absorbing member 50. The moving path of the liquid absorbing member 50 is a zigzag path winding up and down when viewed from a running direction (arrow d2). This makes it possible to use the longer liquid absorbing member 50 in a smaller space and decrease a replacement frequency upon degradation in performance of the liquid absorbing member 50.

One of the plurality of driven rotating members 511 includes a tension adjustment mechanism 513. The tension adjustment mechanism 513 is a mechanism that adjusts the tension of the liquid absorbing member 50 and includes a support member 513a, a moving mechanism 513b, and a sensor 513c. The support member 513a supports the driven rotating member 511 rotatably about the axis in the Y direction. The moving mechanism 513b is a mechanism that moves the support member 513a and is, for example, an electric cylinder. The moving mechanism 513b can displace the driven rotating member 511, adjusting the tension of the liquid absorbing member 50. The sensor 513c detects the tension of the liquid absorbing member 50. In this embodiment, the sensor 513c detects a load received by the moving mechanism 513b. The tension of the liquid absorbing member 50 can be controlled automatically by controlling the moving mechanism 513b based on a detection result of the sensor 513c.

The position adjustment mechanism 512 includes a movable member 512a and a pressing mechanism 512b. The movable member 512a is arranged facing the transfer member 2 and has a peripheral surface where the liquid absorbing member 50 slides. The pressing mechanism 512b is a mechanism that moves the movable member 512a back and forth to the side of the transfer member 2, and is, for example, an electric cylinder but may be an elastic member such as a coil spring. The liquid absorbing member 50 is brought into contact with the transfer member 2 or maintained at a position an infinitesimal distance away from the surface by the position adjustment mechanism 512, and absorbs the liquid component from the ink image IM formed on the transfer member 2 before the transfer.

A sensor SR1 detects a running speed of the liquid absorbing member 50. The sensor SR1 is, for example, a rotary encoder. In this embodiment, a rotating member RL of the sensor SR1 contacts the liquid absorbing member 50, is driven to rotate in accordance with running of the liquid absorbing member 50, and detects its rotation amount. The rotating member RL is arranged facing the driven rotating member 511. It is also possible to detect the running speed of the liquid absorbing member 50 by detecting the rotation speeds of the driven rotating members 511 and the driving rotating member 510. However, the liquid absorbing member 50 may slip with respect to them. As in this embodiment, it is possible to improve detection accuracy by detecting the running speed of the liquid absorbing member 50 directly with the sensor SR1.

The transfer control unit 15B controls driving of the motor M based on the detection result of the sensor SR1. The transfer control unit 15B drives the motor M so that, for example, the liquid absorbing member 50 runs in synchronous with the movement of the transfer member 2. In other words, the transfer control unit 15B controls the motor M so that the peripheral speed of the surface of the transfer member 2 coincides with the running speed of the liquid absorbing member 50. This can suppress rubbing of the liquid absorbing member 50 against the coloring material of the ink image IM. The peripheral speed of the transfer member 2 can be obtained by acquiring control information of the transfer unit 4 from the conveyance control unit 15D.

The recovery units 52 and 53 are apparatuses that recover the liquid absorption performance of the liquid absorbing member 50. By providing such recovery mechanism, it is possible to suppress degradation in performance of the liquid absorbing member 50, and maintain the liquid absorption performance for a longer period. This can decrease the replacement frequency of the liquid absorbing member 50.

The recovery unit 52 is an apparatus that applies a moisturizing liquid to the liquid absorbing member 50. The recovery unit 52 includes an applying roller 520, a supply unit 521, a support member 524, and a driving unit 525.

The applying roller 520 is arranged in the moving path of the liquid absorbing member 50. In this embodiment, the applying roller 520 is arranged facing the driven rotating member 511. At an application position, the liquid absorbing member 50 is nipped by the applying roller 520 and the driven rotating member 511, and driven to rotate in accordance with running of the liquid absorbing member 50. The applying roller 520 is a rotating member whose peripheral surface is supplied with the moisturizing liquid supplied from the supply unit 521, and applies the moisturizing liquid to the surface 50a while contacting the liquid absorbing member 50. The peripheral surface of the applying roller 520 is made of, for example, rubber.

The support member 524 supports the applying roller 520 rotatably about an axis in the Y direction, and also supports the supply unit 521. The supply unit 521 includes a reservoir tank 522 and a driving unit 523. The reservoir tank 522 reserves a moisturizing liquid 522a. In this embodiment, the reservoir tank 522 is a box whose top portion is open, and a portion of the peripheral surface of the applying roller 520 is dipped in the moisturizing liquid 522a.

When the applying roller 520 rotates, the moisturizing liquid 522a is drawn up, supplied to the peripheral surface of the applying roller 520, and applied to the liquid absorbing member 50. The moisturizing liquid 522a is, for example, water. The moisturizing liquid 522a may contain a water-soluble organic solvent or a surfactant.

The use of the liquid absorbing member 50 may thicken the surface 50a. This may degrade the performance of absorbing the liquid component from the ink image IM. By applying the moisturizing liquid 522a to the surface 50a, it is possible to suppress thickening of the surface 50a, and maintain the performance of absorbing the liquid component.

The driving unit 523 is a moving unit that moves the reservoir tank 522, and is, for example, an electric cylinder. In this embodiment, the driving unit 523 moves the reservoir tank 522 in a d4 direction (the Z direction in this example) between a dipping position at which a portion of the applying roller 520 is dipped in the moisturizing liquid 522a and a retracting position at which the portion is not dipped in the moisturizing liquid 522a.

The driving unit 525 is a moving unit that moves the support member 524, and is, for example, an electric cylinder. The driving unit 525 moves the support member 524, and the applying roller 520 and supply unit 521 supported by the support member 524 in a d3 direction (the Z direction in this example).

FIG. 10 is a view for explaining the operation of the recovery unit 52 with respect to driving of the driving units 523 and 525.

In this embodiment, the driving unit 525 moves the applying roller 520 to contact or separate from the liquid absorbing member 50. This can improve workability by separating the applying roller 520 from the liquid absorbing member 50 at the time of maintenance. A state ST1 in FIG. 10 indicates a state in which the applying roller 520 is spaced apart from the liquid absorbing member 50 by making the driving unit 525 contract.

When starting the operation of the system, the driving unit 525 is extended to bring the applying roller 520 into contact with the liquid absorbing member 50, as shown in a state ST2. This can apply the moisturizing liquid 522a to the liquid absorbing member 50.

In this embodiment, the driving unit 523 controls the supply amount of the moisturizing liquid 522a to the applying roller 520, that is, the application amount of the moisturizing liquid 522a to the liquid absorbing member 50. If the liquid absorbing member 50 is dried, the surface 50a may be thickened, as described above, and thus the need to increase the application amount of the moisturizing liquid 522a becomes high. On the other hand, if the liquid absorbing member 50 is sufficiently wet, the performance of absorbing the liquid component from the ink image IM is saturated. In this case, the need to decrease the application amount of the moisturizing liquid 522a becomes high.

The state ST2 indicates a state in which the driving unit 523 extends and the reservoir tank 522 is positioned at the dipping position. In this state, since a portion of the applying roller 520 is dipped in the moisturizing liquid 522a, the moisturizing liquid 522a is supplied to the peripheral surface of the applying roller 520, and applied to the liquid absorbing member 50. A state ST3 indicates a state in which the driving unit 523 contracts and the reservoir tank 522 is positioned at the retracting position. In this state, since the portion of the applying roller 520 is not dipped in the moisturizing liquid 522a, no moisturizing liquid 522a is supplied to the peripheral surface of the applying roller 520. Therefore, no moisturizing liquid 522a is applied to the liquid absorbing member 50.

By switching between the states ST2 and ST3 in accordance with the dry state of the liquid absorbing member 50, it is possible to control the supply amount of the moisturizing liquid 522a to the applying roller 520 (the application amount of the moisturizing liquid 522a to the liquid absorbing member 50), thus maintaining a state in which the liquid absorbing member 50 is moderately wet. The application amount of the moisturizing liquid 522a can be controlled by switching between the states ST1 and ST2 by the driving unit 525. In this case, however, an operation of moving the applying roller 520 to contact or separate from the liquid absorbing member 50 is repeatedly performed, and thus the liquid absorbing member 50 may be damaged. Since switching between the states ST2 and ST3 is performed in a state in which the applying roller 520 is in contact with the liquid absorbing member 50, it is possible to reduce damage to the liquid absorbing member 50.

Referring back to FIG. 8, the recovery unit 53 is an apparatus that removes, from the liquid absorbing member 50, the liquid component absorbed by the liquid absorbing member 50. In this embodiment, the recovery unit 53 includes a nozzle 530 that sprays air and a reservoir tank 531 that accommodates the removed liquid component. The nozzle 530 sprays air to the surface 50b of the liquid absorbing member 50 to blow away the liquid component absorbed by the reverse layer 502 by air pressure, thereby removing the liquid component. By removing the liquid component from the reverse layer 502, it is possible to recover the liquid absorption capacity of the liquid absorbing member 50 while suppressing drying of the surface 50a moisturized by the recovery unit 52.

In this embodiment, the air spray direction of the nozzle 530 faces the driven rotating member 511, and air is sprayed to the liquid absorbing member 50 backed up by the driven rotating member 511. Therefore, even if air pressure is increased, it is possible to suppress deformation of the liquid absorbing member 50. Furthermore, the air spray direction of the nozzle 530 faces in a direction intersecting the thickness direction of the liquid absorbing member 50. Thus, it is possible to remove the liquid component while preventing the liquid component from flowing backward from the reverse layer 502 to the obverse layer 501. The reservoir tank 531 is formed to surround the air spray position of the driven rotating member 511, and can capture the removed liquid component more reliably.

During the operation of the printing system 1, the nozzle 530 may spray air all the time, or intermittently or regularly in accordance with the liquid component absorption status of the liquid absorbing member 50. In this embodiment, the arrangement of removing the liquid component from the liquid absorbing member 50 by spraying air is used. However, another arrangement can be adopted. For example, an arrangement of removing the liquid component by bringing a roller having a liquid absorbing body on its peripheral surface into contact with the liquid absorbing member 50 or an arrangement of squeezing the liquid component by pressing a squeezing roller against the liquid absorbing member 50 can be adopted.

As described above, this embodiment adopts an arrangement in which the recovery units 52 and 53 perform recovery processing in the processing order of moisturizing and removing the liquid component from the upstream side to the downstream size in the running direction of the liquid absorbing member 50. The processing order is not limited to this. In the processing order according to this embodiment, however, by removing the liquid component by the recovery unit 53 on the relatively downstream side, it is possible to remove the liquid component in a location where the surface 50b runs at a high position in the vertical direction. This has an advantage that it is easy to spray air to the surface 50b and collect the removed liquid component using gravity.

<Example of Control>

Figure 11A:
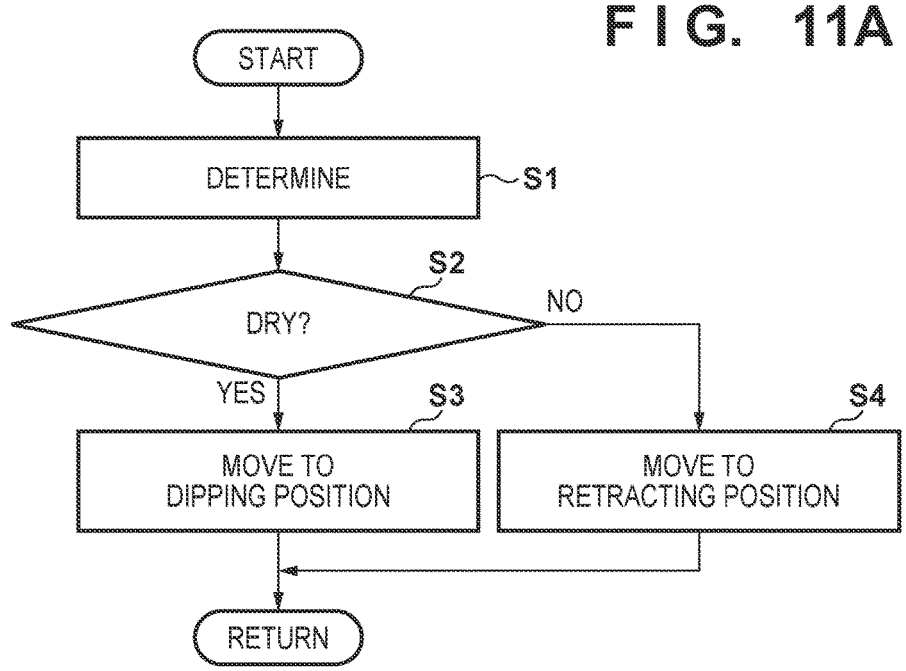
FIG. 11A is a flowchart illustrating an example of control of the recovery unit shown in FIG. 10.

An example of control of the recovery unit 52 will be described. The recovery unit 52 is controlled by the transfer control unit 15B. FIG. 11A is a flowchart illustrating an example of control of the driving unit 523 of the recovery unit 52, and an example of control of the application amount of the moisturizing liquid 522a to the liquid absorbing member 50.

In step S1, the dry state of the liquid absorbing member 50 is determined. An example of a determination method will be described later. In step S2, it is determined whether a determination result in step S1 indicates that the degree of dryness is high. If the degree of dryness is high, the process advances to step S3. Otherwise, the process advances to step S4. In step S3, the driving unit 523 moves the reservoir tank 522 to the dipping position (if the reservoir tank 522 is already positioned at the dipping position, the state is maintained). This applies the moisturizing liquid 522a to the liquid absorbing member 50, improving the degree of dryness. In step S4, the driving unit 523 moves the reservoir tank 522 to the retracting position (if the reservoir tank 522 is already positioned at the retracting position, the state is maintained). This restricts application of the moisturizing liquid 522a to the liquid absorbing member 50, making it possible to avoid the performance of absorbing the liquid component from being saturated in the liquid absorbing member 50.

Note that in this embodiment, to control the application amount of the moisturizing liquid 522a to the liquid absorbing member 50, control is performed to switch between the state (state ST2) in which the applying roller 520 is dipped in the moisturizing liquid 522a of the reservoir tank 522 and the state (state ST3) in which no applying roller 520 is dipped. However, the dipping amount of the applying roller 520 in the moisturizing liquid 522a may be changed. For example, if it is determined that the degree of dryness is high, the reservoir tank 522 is moved (raised in this embodiment) in a direction in which the dipping amount is increased. If it is determined that the degree of dryness is low, the reservoir tank 522 is moved (lowered in this embodiment) in a direction in which the dipping amount is decreased.

An example of the determination method in step S1 will be described next. The dry state of the liquid absorbing member 50 can be determined based on, for example, an amount of ink discharged to the transfer member 2 to form the ink image IM. More specifically, an ink discharge amount by the print unit 3 can be specified and compared with a threshold, thereby performing determination. If the amount of discharged ink is large, the absorption amount of the liquid component of the liquid absorbing member 50 is also large and it is thus considered that the degree of dryness of the liquid absorbing member 50 is low. Conversely, if the amount of discharged ink is small, the absorption amount of the liquid component of the liquid absorbing member 50 is also small and it is thus considered that the degree of dryness of the liquid absorbing member 50 is high. Since the amount of discharged ink is not always constant over time, it is necessary to perform determination in accordance with time.

Figure 11B:
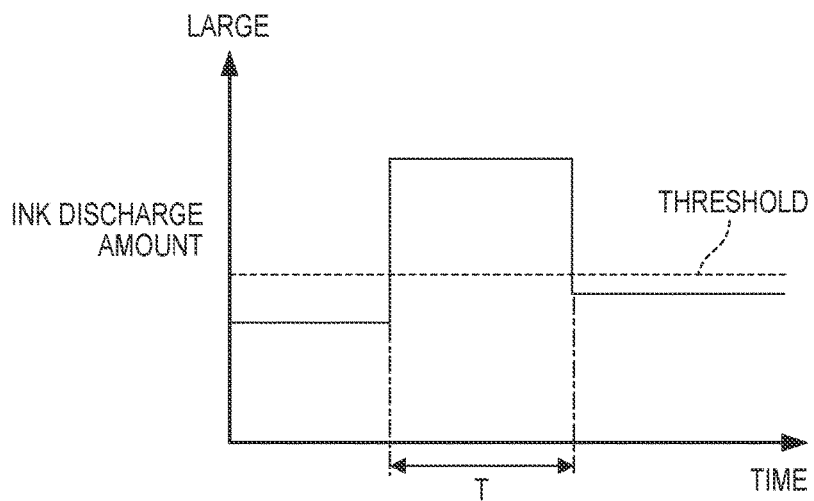
FIG. 11B is a timing chart for explaining a method of determining a dry state.

FIG. 11B is a timing chart showing an example. The ink discharge amount indicated by a solid line can be specified based on, for example, the control amount of the printing control unit 15A that controls the print unit 3. In the example of FIG. 11B, the ink discharge amount is larger than the threshold in a section T. In this case, it is determined that the degree of dryness of the liquid absorbing member 50 is low, and the reservoir tank 522 is moved to the retracting position. In a section other than the section T, the ink discharge amount is equal to or smaller than the threshold. Therefore, it is determined that the degree of dryness of the liquid absorbing member 50 is high, and the reservoir tank 522 is moved to the dipping position.

Figure 12A:
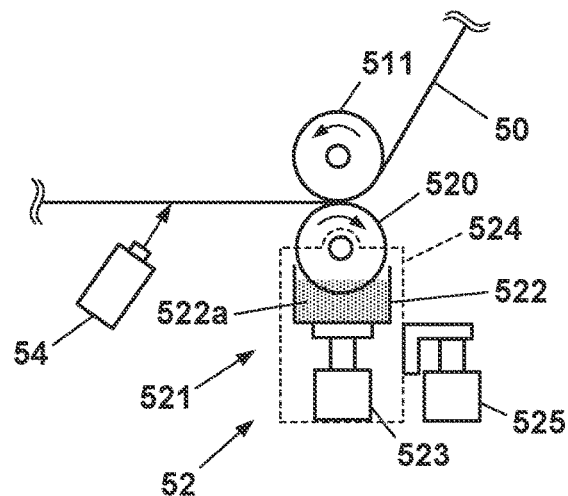
FIGS. 12A and 12B are views for explaining another method of determining a dry state.

FIG. 12A shows another example of the determination method in step S1. In the example of FIG. 12A, a sensor 54 that detects the dry state of the liquid absorbing member 50 is provided. The sensor 54 is, for example, an infrared sensor that detects the water content of the liquid absorbing member 50 without contacting the liquid absorbing member 50. If the water content detected by the sensor 54 is large, it is determined that the degree of dryness is low. Otherwise, it is determined that the degree of dryness is high.

Figure 12B:
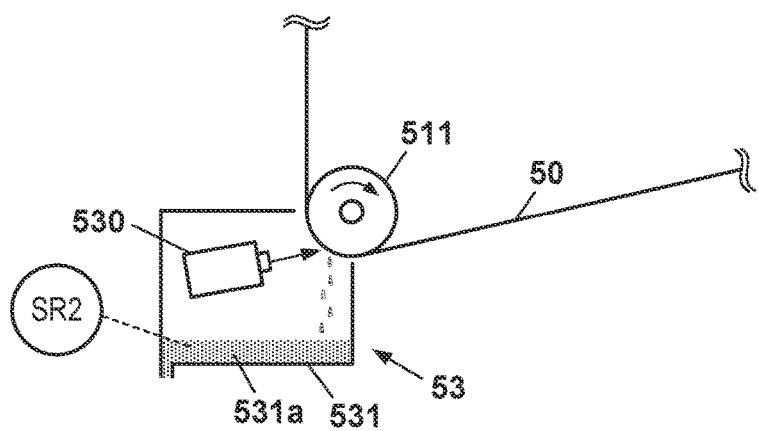

FIG. 12B shows still another example of the determination method in step S1. In the example of FIG. 12B, a sensor SR2 that detects the removal amount of the liquid component removed by the recovery unit 53 is provided. The sensor SR2 is, for example, a sensor that detects the water level of the reservoir tank 531 or a sensor that detects an amount of drainage flowing out from the reservoir tank 531. For the sensor that detects the water level, if the water level is high, it can be determined that the removal amount is large, that is, the degree of dryness is low. Otherwise, it can be determined that the degree of dryness is high. For the sensor that detects the amount of drainage, if the amount of drainage is large, it can be determined that the removal amount is large, that is, the degree of dryness is low. Otherwise, it can be determined that the degree of dryness is high.

<Another Example of Arrangement of Recovery Unit 52>

Another example of the arrangement of the recovery unit 52 will be described with reference to FIGS. 13A and 13B. The same reference numerals denote the same or similar components as those of the above-described recovery unit 52.

Figure 13A:
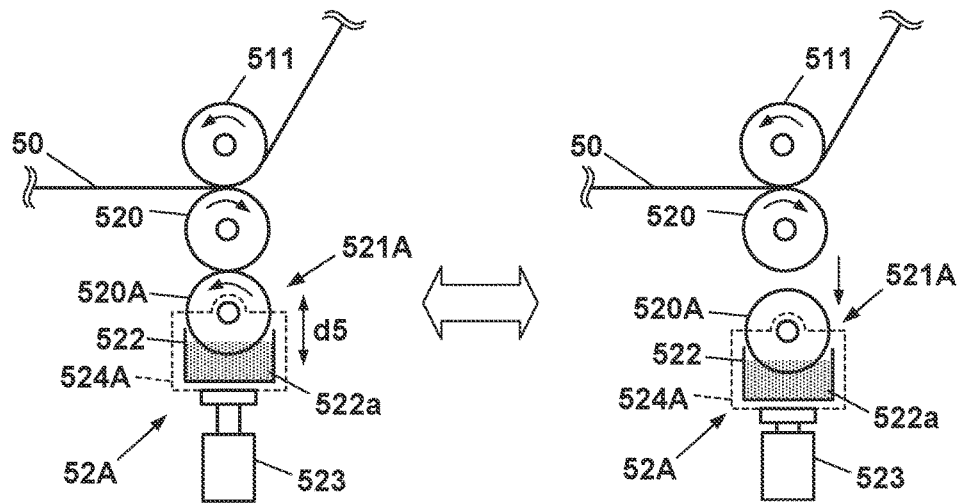
FIGS. 13A and 13B are views for explaining another example of the recovery unit.

A recovery unit 52A shown in FIG. 13A is an example in which an intermediate roller is provided. The recovery unit 52A includes an applying roller 520 and a supply unit 521A. In the example of FIG. 13A, the applying roller 520 is configured not to be movable.

The supply unit 521A includes an intermediate roller 520A, a support member 524A, and a driving unit 523. The support member 524A supports the intermediate roller 520A rotatably about an axis in the Y direction, and also supports a reservoir tank 522. The reservoir tank 522 reserves a moisturizing liquid 522a, and a portion of the peripheral surface of the intermediate roller 520A is dipped in the moisturizing liquid 522a.

The driving unit 523 is a moving unit that moves the support member 524A, and is, for example, an electric cylinder. The driving unit 523 moves the support member 524A, and the intermediate roller 520A and reservoir tank 522 supported by the support member 524A in a d5 direction (the Z direction in this example). This moves the intermediate roller 520A to contact or separate from the applying roller 520.

In a state (on the left side in FIG. 13A) in which the intermediate roller 520A abuts against the applying roller 520, when the intermediate roller 520A rotates, the moisturizing liquid 522a is drawn up, supplied to the peripheral surface of the applying roller 520, and applied to the liquid absorbing member 50.

In a state (on the right side in FIG. 13A) in which the intermediate roller 520A is spaced apart from the applying roller 520, the moisturizing liquid 522a is not supplied to the peripheral surface of the applying roller 520, and is not applied to the liquid absorbing member 50.

Application of the moisturizing liquid to the liquid absorbing member 50 is not limited to the roller, and another applying medium can be adopted. FIG. 13B shows a recovery unit 52B that adopts an endless applying belt 526 instead of the applying roller 520. The applying belt 526 is wound around a plurality of rotating members 527a to 527d and runs cyclically. The liquid absorbing member 50 and the applying belt 526 are nipped between the driven rotating member 511 and the rotating member 527a. The applying belt 526 is driven and runs in accordance with the rotation of the driven rotating member 511.

A supply unit 521B includes a reservoir tank 528 and a driving unit 529. The reservoir tank 528 reserves a moisturizing liquid 528a, and a portion of the applying belt 526 is dipped in the moisturizing liquid 528a at the position of the rotating member 527c.

The driving unit 529 is a moving unit that moves the reservoir tank 528, and is, for example, an electric cylinder. The driving unit 529 moves the reservoir tank 528 in a d6 direction (the Z direction in this example). This can switch application of the moisturizing liquid 528a to the liquid absorbing member 50.

Figure 13B:
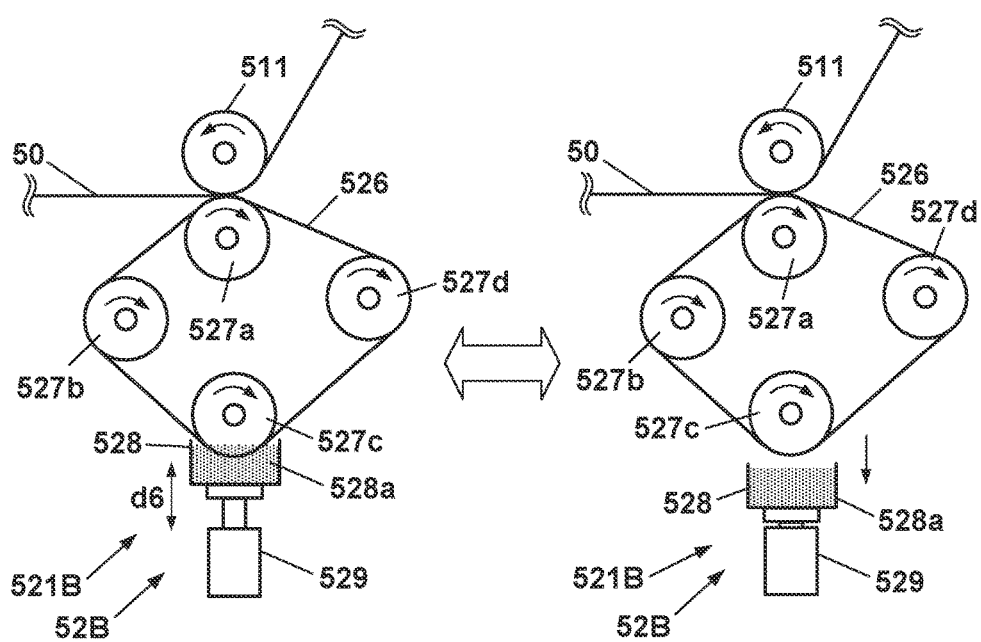

The state shown on the left side in FIG. 13B indicates a state in which the driving unit 529 extends and the reservoir tank 522 is positioned at the dipping position. In this state, since a portion of the applying belt 526 is dipped in the moisturizing liquid 528a, the moisturizing liquid 528a is applied to the liquid absorbing member 50. The state shown on the right side in FIG. 13B indicates a state in which the driving unit 529 contracts and the reservoir tank 528 is positioned at the retracting position. In this state, since the portion of the applying belt 526 is not dipped in the moisturizing liquid 528a, no moisturizing liquid 528a is applied to the liquid absorbing member 50.

<Another Example of Arrangement of Absorption Unit>

Figure 14:
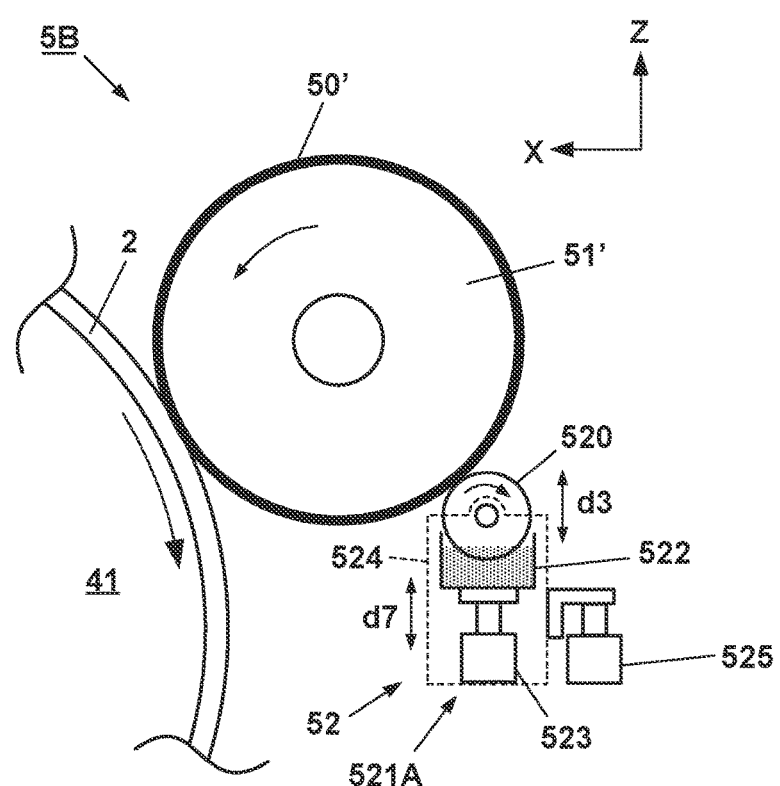
FIG. 14 is a schematic view showing another example of the absorption unit.

The above-described embodiment adopts the arrangement in which the liquid absorbing member 50 is formed into an endless swath and runs cyclically. However, another arrangement can be adopted. FIG. 14 shows an example. In the example of FIG. 14, a support unit 51' forms a rotating member such as a roller that can rotate about an axis in the Y direction, and a liquid absorbing member 50' is disposed on its peripheral surface. The liquid absorbing member 50' moves cyclically by rotating the support unit 51'. A recovery unit 52 is exemplarily arranged in the middle of the moving path of the liquid absorbing member 50'.

The support unit 51' may be driven to rotate in accordance with the transfer drum 41, or have a driving mechanism that rotates the support unit 51' independently.

<Other Embodiments>

In the above embodiment, the print unit 3 includes the plurality of printheads 30. However, a print unit 3 may include one printhead 30. The printhead 30 may not be a full-line head but may be of a serial type that forms an ink image by discharging ink from the printhead 30 while a carriage that mounts the printhead 30 detachably moves in a Y direction.

A conveyance mechanism of a print medium P may adopt another method such as a method of clipping and conveying the print medium P by a pair of rollers. In the method of conveying the print medium P by the pair of rollers or the like, a roll sheet may be used as the print medium P, and a printed product P' may be formed by cutting the roll sheet after transfer.

In the above embodiment, the transfer member 2 is provided on the outer peripheral surface of the transfer drum 41. However, another method such as a method of forming a transfer member 2 into an endless swath and running it cyclically may be used.

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-061880, filed Mar. 27, 2017, which is hereby incorporated by reference herein in its entirety.

What is claimed is:

1. A printing apparatus comprising:
a transfer member configured to cyclically pass through a formation area of an ink image and a transfer area of the ink image;
a print unit configured to form the ink image on the transfer member by discharging ink to the transfer member in the formation area;
a transfer unit configured to transfer the ink image from the transfer member to a print medium;
a liquid absorption unit configured to absorb a liquid component from the ink image on the transfer member before the transfer by the transfer unit; and
a control unit,
wherein the liquid absorption unit includes:
a liquid absorbing member configured to absorb the liquid component;
a support unit configured to support the liquid absorbing member to be movable cyclically;
an applying unit arranged in a moving path of the liquid absorbing member and configured to apply a moisturizing liquid while contacting the liquid absorbing member; and
a supply unit configured to supply the moisturizing liquid to the applying unit, and
wherein the control unit controls a supply amount of the moisturizing liquid supplied to the applying unit by the supply unit.

2. The apparatus according to claim 1, wherein
the liquid absorbing member comprises an endless sheet,
the support unit supports the sheet to be able to run cyclically,
the applying unit comprises a roller contacting the sheet, and
the supply unit supplies the moisturizing liquid to a peripheral surface of the roller.

3. The apparatus according to claim 2, wherein the supply unit includes:
a reservoir tank configured to store the moisturizing liquid; and
a moving unit configured to move the reservoir tank between a position at which a portion of the roller is dipped in the moisturizing liquid, and a position at which the portion is not dipped in the moisturizing liquid, and
wherein the control unit controls the supply amount by moving the reservoir tank.

4. The apparatus according to claim 3, wherein the moving unit is further configured to move the roller between a position at which the roller contacts the liquid absorbing member, and a position at which the roller is spaced apart from the liquid absorbing member.

5. The apparatus according to claim 1, wherein the control unit determines a dry state of the liquid absorbing member, and controls the supply amount based on a determination result of the dry state.

6. The apparatus according to claim 5, wherein the control unit determines the dry state of the liquid absorbing member based on an amount of ink discharged to the transfer member for forming the ink image.

7. The apparatus according to claim 5, further comprising a sensor configured to detect the dry state of the liquid absorbing member,
wherein the control unit determines the dry state of the liquid absorbing member based on a detection result of the sensor.

8. The apparatus according to claim 5, wherein the liquid absorption unit further includes
a removal unit arranged in the moving path of the liquid absorbing member and configured to remove the liquid component from the liquid absorbing member; and
a sensor configured to detect a removal amount of the liquid component by the removal unit, and
wherein the control unit determines the dry state of the liquid absorbing member based on a detection result of the sensor.

9. A liquid absorbing apparatus for absorbing a liquid component from an ink image formed on a transfer member before transferring the ink image to a print medium, the liquid absorbing apparatus comprising:
a liquid absorbing member configured to absorb the liquid component;
a support unit configured to support the liquid absorbing member to be movable cyclically;
an applying unit arranged in a moving path of the liquid absorbing member and configured to apply a moisturizing liquid while contacting the liquid absorbing member;
a supply unit configured to supply the moisturizing liquid to the applying unit; and
a control unit configured to control a supply amount of the moisturizing liquid supplied to the applying unit by the supply unit.

10. The apparatus according to claim 9, wherein
the liquid absorbing member comprises an endless sheet,
the support unit supports the sheet to be able to run cyclically,
the applying unit comprises a roller contacting the sheet, and
the supply unit supplies the moisturizing liquid to a peripheral surface of the roller.

11. The apparatus according to claim 10, wherein the supply unit includes:
a reservoir tank configured to store the moisturizing liquid; and
a moving unit configured to move the reservoir tank between a position at which a portion of the roller is dipped in the moisturizing liquid, and a position at which the portion is not dipped in the moisturizing liquid, and
wherein the control unit controls the supply amount by moving the reservoir tank.

12. The apparatus according to claim 11, wherein the moving unit is further cofigured to move the roller between a position at which the roller contacts the liquid absorbing member, and a position at which the roller is spaced apart from the liquid absorbing member.

13. The apparatus according to claim 9, wherein the control unit determines a dry state of the liquid absorbing member, and controls the supply amount based on a determination result of the dry state.

14. The apparatus according to claim 13, wherein the control unit determines the dry state of the liquid absorbing member based on an amount of ink discharged to the transfer member for forming the ink image.

15. The apparatus according to claim 13, further comprising a sensor configured to detect the dry state of the liquid absorbing member,
   wherein the control unit determines the dry state of the liquid absorbing member based on a detection result of the sensor.

16. The apparatus according to claim 13, further comprising:
   a removal unit arranged in the moving path of the liquid absorbing member and configured to remove the liquid component from the liquid absorbing member; and
   a sensor configured to detect a removal amount of the liquid component by the removal unit,
   wherein the control unit determines the dry state of the liquid absorbing member based on a detection result of the sensor.

17. A printing method of transferring an ink image to a print medium via a transfer member, the method comprising:
   forming the ink image on the transfer member by discharging ink to the transfer member;
   absorbing a liquid component from the ink image on the transfer member after the forming; and
   transferring the ink image from the transfer member to the print medium after the absorbing,
   wherein the absorbing includes:
   cyclically moving a liquid absorbing member configured to absorb the liquid component from the ink image;
   applying a moisturizing liquid to the liquid absorbing member by an applying unit contacting the liquid absorbing member in the moving; and
   controlling a supply amount of the moisturizing liquid supplied to the applying unit.

* * * * *